(12) United States Patent
Ozawa et al.

(10) Patent No.: US 11,437,065 B2
(45) Date of Patent: *Sep. 6, 2022

(54) MAGNETIC RECORDING MEDIUM AND MAGNETIC RECORDING AND REPRODUCING DEVICE

(71) Applicant: FUJIFILM Corporation, Tokyo (JP)

(72) Inventors: Eiki Ozawa, Minami-ashigara (JP); Norihito Kasada, Minami-ashigara (JP)

(73) Assignee: FUJIFILM Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/022,919

(22) Filed: Sep. 16, 2020

(65) Prior Publication Data

US 2021/0082464 A1 Mar. 18, 2021

(30) Foreign Application Priority Data

Sep. 17, 2019 (JP) .............................. JP2019-168024

(51) Int. Cl.
  *G11B 5/702* (2006.01)
  *G11B 5/706* (2006.01)
  *G11B 5/008* (2006.01)
  *G11B 5/735* (2006.01)

(52) U.S. Cl.
  CPC ...... *G11B 5/70678* (2013.01); *G11B 5/00813* (2013.01); *G11B 5/702* (2013.01); *G11B 5/7356* (2019.05)

(58) Field of Classification Search
  CPC .............................................. G11B 5/70–7085
  See application file for complete search history.

(56) References Cited

U.S. PATENT DOCUMENTS

| | | | |
|---|---|---|---|
| 4,590,524 A | 5/1986 | Okamoto et al. | |
| 4,727,438 A | 2/1988 | Juso et al. | |
| 4,988,562 A | 1/1991 | Ryoke et al. | |
| 5,305,159 A | 4/1994 | Sakai et al. | |
| 5,544,140 A | 8/1996 | Seagrave et al. | |
| 5,606,469 A | 2/1997 | Kosugi et al. | |
| 6,033,760 A | 3/2000 | Wakana et al. | |
| 6,579,592 B1 | 6/2003 | Matsubaguchi et al. | |
| 6,744,585 B1 | 6/2004 | Nishida et al. | |
| 7,092,199 B2 | 8/2006 | Nakamura et al. | |
| 7,187,511 B2 | 3/2007 | Nakao | |
| 7,494,728 B2 | 2/2009 | Kuse et al. | |
| 7,532,425 B2 | 5/2009 | Abe et al. | |
| 7,755,863 B2 | 7/2010 | Neumann et al. | |
| 8,861,111 B1 | 10/2014 | Liao et al. | |
| 8,947,821 B1 | 2/2015 | Blinick et al. | |
| 9,928,854 B1 | 3/2018 | Jury et al. | |
| 9,978,414 B1 | 5/2018 | Kaneko et al. | |
| 10,074,393 B2 | 9/2018 | Kaneko et al. | |
| 10,504,546 B2 | 12/2019 | Kaneko et al. | |
| 10,510,369 B2 | 12/2019 | Kaneko et al. | |
| 10,643,646 B2 | 5/2020 | Kasada et al. | |
| 10,643,647 B2 | 5/2020 | Kasada et al. | |
| 10,679,655 B2 | 6/2020 | Ozawa et al. | |
| 10,692,528 B2 | 6/2020 | Ozawa et al. | |
| 10,706,875 B2 | 7/2020 | Kasada et al. | |
| 10,755,735 B2 | 8/2020 | Ozawa et al. | |
| 10,755,741 B2 | 8/2020 | Ozawa et al. | |
| 10,789,981 B2 | 9/2020 | Musha | |
| 2003/0095353 A1 | 5/2003 | Nakao | |
| 2003/0142431 A1 | 7/2003 | Ejiri et al. | |
| 2006/0068232 A1 | 3/2006 | Mikamo et al. | |
| 2006/0119969 A1 | 6/2006 | Hutchins et al. | |
| 2011/0110210 A1 | 5/2011 | Honma | |
| 2012/0003503 A1 | 1/2012 | Mori | |
| 2012/0196156 A1 | 8/2012 | Suzuki | |
| 2012/0244387 A1 | 9/2012 | Mori et al. | |
| 2014/0272474 A1 | 9/2014 | Kasada | |
| 2015/0029608 A1 | 1/2015 | Mathew et al. | |
| 2016/0064025 A1* | 3/2016 | Kurokawa ............... G11B 5/71 428/840.4 |
| 2016/0093322 A1 | 3/2016 | Kasada et al. | |
| 2016/0171993 A1 | 6/2016 | Okubo | |
| 2017/0004856 A1 | 1/2017 | Tada et al. | |
| 2017/0186460 A1 | 6/2017 | Kasada et al. | |
| 2017/0372738 A1 | 12/2017 | Kasada | |
| 2018/0082710 A1 | 3/2018 | Tada et al. | |
| 2018/0358044 A1 | 12/2018 | Shirata et al. | |
| 2018/0358046 A1 | 12/2018 | Shirata et al. | |
| 2018/0374503 A1 | 12/2018 | Kasada | |
| 2018/0374504 A1 | 12/2018 | Kasada | |

(Continued)

FOREIGN PATENT DOCUMENTS

| JP | 59-221830 A | 12/1984 |
|---|---|---|
| JP | 1-318953 A | 12/1989 |

(Continued)

OTHER PUBLICATIONS

Office Action dated Apr. 27, 2021 by the Japanese Patent Office in Japanese Application No. 2020-122791.
Communication dated Mar. 3, 2020 by the Japanese Patent Application No. 2017-123041; corresponds to U.S. Appl. No. 16/009,570.
Hanaor et al., "Anodic aqueous electrophoretic deposition of titanium dioxide using carboxylic acids as dispersing agents", Journal of the European Ceramic Society, 2011, vol. 31, No. 6, pp. 1041-1047.
Notice of Allowance dated Feb. 20, 2020 in U.S. Appl. No. 16/456,745.
Notice of Allowance dated Feb. 25, 2020 in U.S. Appl. No. 16/456,459.
Notice of Allowance dated Jan. 13, 2020 in U.S. Appl. No. 16/456,970.
Notice of Allowance dated Jan. 27, 2021 in U.S. Appl. No. 16/777,312.

(Continued)

*Primary Examiner* — Holly Rickman
*Assistant Examiner* — Lisa Chau
(74) *Attorney, Agent, or Firm* — Sughrue Mion, PLLC

(57) ABSTRACT

The magnetic recording medium includes a non-magnetic support; and a magnetic layer including a ferromagnetic powder, in which an isoelectric point of a surface zeta potential of the magnetic layer after pressing the magnetic layer at a pressure of 70 atm is equal to or less than 3.8.

18 Claims, No Drawings

(56) References Cited

U.S. PATENT DOCUMENTS

| | | | |
|---|---|---|---|
| 2018/0374505 A1 | 12/2018 | Kasada et al. |
| 2018/0374506 A1 | 12/2018 | Kasada |
| 2018/0374507 A1 | 12/2018 | Kasada |
| 2019/0295586 A1 | 9/2019 | Kasada |
| 2019/0295589 A1 | 9/2019 | Kasada |
| 2020/0005814 A1 | 1/2020 | Kasada et al. |
| 2020/0005817 A1 | 1/2020 | Ozawa et al. |
| 2020/0005818 A1 | 1/2020 | Kasada et al. |
| 2020/0005822 A1 | 1/2020 | Kasada et al. |
| 2020/0005827 A1 | 1/2020 | Ozawa et al. |
| 2020/0005828 A1 | 1/2020 | Ozawa et al. |
| 2020/0035267 A1 | 1/2020 | Kasada |
| 2020/0251134 A1 | 8/2020 | Kasada et al. |
| 2020/0251140 A1 | 8/2020 | Ozawa et al. |
| 2021/0249043 A1 | 8/2021 | Kasada et al. |

FOREIGN PATENT DOCUMENTS

| | | | |
|---|---|---|---|
| JP | 2-168415 A | 6/1990 |
| JP | 3-109701 A | 5/1991 |
| JP | 9-190623 A | 7/1997 |
| JP | 2002-8910 A | 1/2002 |
| JP | 2006-54018 A | 2/2006 |
| JP | 2008-282501 A | 11/2008 |
| JP | 2009-32338 A | 2/2009 |
| JP | 2011-134372 A | 7/2011 |
| JP | 2012-014809 A | 1/2012 |
| JP | 2012-155805 A | 8/2012 |
| JP | 2012-203956 A | 10/2012 |
| JP | 2016-110680 A | 6/2016 |
| JP | 2019-008847 A | 1/2019 |
| JP | 2019-008848 A | 1/2019 |
| JP | 2019-008849 A | 1/2019 |
| JP | 2019-008850 A | 1/2019 |
| JP | 2019-008851 A | 1/2019 |
| JP | 6691511 B2 | 4/2020 |
| JP | 6691512 B2 | 4/2020 |
| JP | 6691513 B2 | 4/2020 |
| JP | 6691514 B2 | 4/2020 |

OTHER PUBLICATIONS

Notice of Allowance dated Jan. 31, 2020 in U.S. Appl. No. 16/456,811.
Notice of Allowance dated Jul. 13, 2021 in U.S. Appl. No. 16/522,806.
Notice of Allowance dated Mar. 13, 2020 in U.S. Appl. No. 16/456,831.
Notice of Allowance dated Mar. 16, 2021 in U.S. Appl. No. 16/777,312.
Notice of Allowance dated May 5, 2020 in U.S. Appl. No. 16/456,965.
Office Action dated Jun. 30, 2020 in U.S. Appl. No. 16/777,312.
Office Action dated Oct. 22, 2020 in U.S. Appl. No. 16/777,312.
Office Action dated Feb. 24, 2020 in U.S. Appl. No. 16/401,776.
Office Action dated Jan. 12, 2021 in Japanese Application No. 2020-177690, corresponds to U.S. Appl. No. 16/522,806.
Office Action dated Jan. 21, 2020 in U.S. Appl. No. 16/456,780.
Office Action dated Jan. 21, 2021 in U.S. Appl. No. 16/522,806.
Office Action dated Nov. 4, 2019 in U.S. Appl. No. 16/401,776.
Office Action dated Feb. 18, 2021 in U.S. Appl. No. 16/009,570.
Notice of Allowance dated Jul. 8, 2021 in U.S. Appl. No. 16/009,570.
U.S. Appl. No. 17/476,565, filed Sep. 16, 2021 (Kasada).
U.S. Appl. No. 17/477,087, filed Sep. 16, 2021 (Kasada).
Office Action dated Nov. 8, 2021 in U.S. Appl. No. 17/242,798.
Office Action dated Dec. 7, 2021 in Japanese Application No. 2019-016523, corresponding to U.S. Appl. No. 17/242,798.
U.S. Appl. No. 16/777,312, now U.S. Pat. No. 11,056,141.
U.S. Appl. No. 16/522,806, Allowed
U.S. Appl. No. 16/009,570, Allowed.
U.S. Appl. No. 17/242,798, Pending.
U.S. Appl. No. 17/022,919 (the present application), Pending.
U.S. Appl. No. 17/476,565, Pending.
U.S. Appl. No. 17/477,087, Pending.
U.S. Appl. No. 16/456,745, now U.S. Pat. No. 10,679,655.
U.S. Appl. No. 16/456,831, now U.S. Pat. No. 10,706,875.
U.S. Appl. No. 16/456,970, now U.S. Pat. No. 10,643,646.
U.S. Appl. No. 16/456,965, now U.S. Pat. No. 10,755,735.
U.S. Appl. No. 16/456,811, now U.S. Pat. No. 10,643,647.
U.S. Appl. No. 16/456,780, now U.S. Pat. No. 10,755,741.
U.S. Appl. No. 16/456,459, now U.S. Pat. No. 10,692,528.
U.S. Appl. No. 16/401,776, now U.S. Pat. No. 10,789,981.
Office Action dated Feb. 15, 2022 in U.S. Appl. No. 16/009,570.
Notice of Allowance dated Mar. 15, 2022 in U.S. Appl. No. 17/242,798.
Office Action dated Mar. 24, 2022 in U.S. Appl. No. 16/522,806.
Office Action dated May 25, 2022 in U.S. Appl. No. 17/476,565.
Notice of Allowance dated Jun. 10, 2022 in U.S. Appl. No. 16/009,570.
Notice of Allowance dated Jul. 11, 2022 in U.S. Appl. No. 16/522,806.

* cited by examiner

MAGNETIC RECORDING MEDIUM AND MAGNETIC RECORDING AND REPRODUCING DEVICE

CROSS-REFERENCE TO RELATED APPLICATIONS

This application claims priority under 35 U.S.C 119 to Japanese Patent Application No. 2019-168024 filed on Sep. 17, 2019. The above application is hereby expressly incorporated by reference, in its entirety, into the present application.

BACKGROUND OF THE INVENTION

1. Field of the Invention

The present invention relates to a magnetic recording medium and a magnetic recording and reproducing device.

2. Description of the Related Art

In recent years, magnetic recording media have been widely used as recording media for data storage for recording and storing various pieces of data (see, for example, JP2019-008848A).

SUMMARY OF THE INVENTION

Data recorded on a magnetic recording medium is generally reproduced by reading data recorded on a magnetic layer by sliding a magnetic head in contact with a surface of the magnetic layer while running the magnetic recording medium in a magnetic recording and reproducing device. However, in a case where the magnetic recording medium has deteriorated running stability, a reproducing output may decrease due to off-track. Thus, it is desirable that the magnetic recording medium has running stability.

Data recorded on various recording media such as a magnetic recording medium is called hot data, warm data, and cold data depending on access frequencies (reproducing frequencies). The access frequencies decrease in the order of hot data, warm data, and cold data, and the recording and storing of the data with low access frequency (for example, cold data) for a long period of time is referred to as "archive". The data amount recorded and stored on a recording medium for the archive increases in accordance with a dramatic increase in information contents and digitization of various information in recent years, and accordingly, a recording and reproducing system suitable for the archive is gaining attention.

A magnetic recording medium capable of exhibiting excellent running stability in a case of reproducing data after long-term storage as described above is suitable as a recording medium for archiving.

In view of the above, one aspect of the invention provides for a magnetic recording medium having excellent running stability after long-term storage.

According to one aspect of the invention, there is provided a magnetic recording medium comprising: a non-magnetic support; and a magnetic layer including a ferromagnetic powder, in which an isoelectric point of a surface zeta potential of the magnetic layer after pressing the magnetic layer at a pressure of 70 atm (hereinafter, also referred to as an "isoelectric point of a surface zeta potential of the magnetic layer after pressing" or an "isoelectric point after pressing") is equal to or less than 3.8.

1 atm=101,325 Pa (Pascal)=101,325 N (Newton)/m².

In an embodiment, the isoelectric point may be 2.5 to 3.8.

In an embodiment, the magnetic layer may include inorganic oxide-based particles.

In an embodiment, the inorganic oxide-based particles may be composite particles of an inorganic oxide and a polymer.

In an embodiment, the magnetic layer may include a binding agent having an acidic group.

In an embodiment, the acidic group may be at least one kind of acidic group selected from the group consisting of sulfonic acid groups and salts thereof.

In an embodiment, the magnetic recording medium may further include a non-magnetic layer including a non-magnetic powder between the non-magnetic support and the magnetic layer.

In an embodiment, the magnetic recording medium may include a back coating layer including a non-magnetic powder on a surface of the non-magnetic support opposite to the surface provided with the magnetic layer.

In an embodiment, the magnetic recording medium may be a magnetic tape.

According to another aspect of the invention, there is provided a magnetic recording and reproducing device comprising the magnetic recording medium; and a magnetic head.

According to one aspect of the invention, it is possible to provide a magnetic recording medium having excellent running stability after long-term storage. In addition, according to one aspect of the invention, it is possible to provide a magnetic recording and reproducing device including the magnetic recording medium.

DESCRIPTION OF THE PREFERRED EMBODIMENTS

Magnetic Recording Medium

One embodiment of the invention relates to a magnetic recording medium including a non-magnetic support and a magnetic layer including a ferromagnetic powder, in which an isoelectric point of a surface zeta potential of the magnetic layer after pressing the magnetic layer at a pressure of 70 atm is equal to or less than 3.8.

Isoelectric Point of Surface Zeta Potential of Magnetic Layer After Pressing

The pressure of 70 atm for pressing the magnetic layer is a surface pressure applied to a surface of the magnetic layer by pressing. By causing the magnetic recording medium to pass between two rolls while causing the magnetic recording medium to run at a speed of 20 m/min, the surface pressure of 70 atm is applied to the surface of the magnetic layer. A tension of 0.5 N/m is applied to the running magnetic recording medium in a running direction. For example, for a tape-shaped magnetic recording medium (that is, a magnetic tape), a tension of 0.5 N/m is applied in the longitudinal direction of the running magnetic tape. The pressing is performed by causing the magnetic recording medium to pass between two rolls six times in total and applying the surface pressure of 70 atm at each time when passing each roll. A metal roll is used as the roll, and the roll is not heated. An environment for performing the pressing is an environment in which an atmosphere temperature is 20° C. to 25° C. and relative humidity is 40% to 60%. The magnetic recording medium to which the pressing is performed, is a magnetic recording medium which is not subjected to the long-term storage for 10 years or longer in an environment of the atmosphere temperature of 20° C. to 25° C. and relative humidity of 40% to 60% (example of storage environment for archiving), and the storage corresponding to such long-term storage or an acceleration test corresponding to such long-term storage. The same applies to various physical properties relating to the magnetic recording medium described in the invention and the specification, unless otherwise noted.

The pressing described above can be performed by using a calender treatment device used for manufacturing a magnetic recording medium. For example, a magnetic tape accommodated in a magnetic tape cartridge is taken out and caused to pass through calender rolls in the calender treatment device, and accordingly, the magnetic tape can be pressed at a pressure of 70 atm.

The inventors of the invention have conducted intensive studies to provide a magnetic recording medium having excellent running stability after long-term storage, and found that it is suitable to press the magnetic layer at a pressure of 70 atm in an acceleration test corresponding to an example of archiving. This point will be further described below.

For example, the magnetic tape is generally accommodated in a magnetic tape cartridge in a state of being wound around a reel. Accordingly, the long-term storage of the magnetic tape after the data with a low access frequency is recorded, is also performed in a state of being accommodated in the magnetic tape cartridge. In the magnetic tape wound around a reel, a surface of a magnetic layer and a surface of a back coating layer (in a case of including a back coating layer) or a surface of the non-magnetic support on a side opposite to a surface of the magnetic layer (in a case of not including a back coating layer) come into contact with each other, and accordingly, the magnetic layer is pressed in the magnetic tape cartridge. As a result of various simulation performed by the inventors, it is determined that it is suitable to press the magnetic layer at a pressure of 70 atm in the acceleration test corresponding to long-term storage (example of archive) for approximately 10 years in an environment of the atmosphere temperature of 20° C. to 25° C. and relative humidity of 40% to 60%. Therefore, the inventors conducted a running stability test after pressing the magnetic layer at 70 atm, and after intensive studies based on the results of this test, it is determined that the magnetic recording medium having an isoelectric point of equal to or less than 3.8 after pressing has excellent running stability after pressing the magnetic layer at 70 atm, that is, running stability in a state corresponding to the above long-term storage. This point is a new finding that has not been previously known and is not disclosed in JP2019-008848A.

A method for measuring the isoelectric point after pressing will be described below. In the invention and the specification, the "surface of the magnetic layer" is identical to the surface of the magnetic recording medium on the magnetic layer side.

In the invention and the specification, the isoelectric point of the surface zeta potential of the magnetic layer is a value of pH, in a case where a surface zeta potential measured by a flow potential method (also referred to as a flow current method) becomes zero. A sample is cut out from the magnetic recording medium which is a measurement target, and the sample is disposed in a measurement cell so that the surface of the magnetic layer comes into contact with an electrolyte. Pressure in the measurement cell is changed to flow the electrolyte and a flow potential at each pressure is measured, and then, the surface zeta potential is obtained by the following calculation expression.

$$\zeta = \frac{dI}{dp} \times \frac{\eta}{\varepsilon \varepsilon_0} \frac{L}{A}$$

[$\zeta$: surface zeta potential, p: pressure, I: flow potential, $\eta$: viscosity of electrolyte, $\varepsilon$: relative dielectric constant of electrolyte, $\varepsilon_0$: dielectric constant in a vacuum state, L: length of channel (flow path between two electrodes), A: area of cross section of channel]

The pressure is changed in a range of 0 to 400,000 Pa (0 to 400 mbar). The calculation of the surface zeta potential by flowing the electrolyte to the measurement cell and measuring a flow potential is performed by using electrolytes having different pH (from pH of 9 to pH of 3 at interval of approximately 0.5). A total number of measurement points is 13 from the measurement point of pH 9 to the 13th measurement points of pH 3. By doing so, the surface zeta potentials of each measurement point of pH is are obtained. As pH decreases, the surface zeta potential decreases. Thus, two measurement points at which polarity of the surface zeta potential changes (a change from a positive value to a negative value) may appear, while pH decreases from 9 to 3. In a case where such two measurement points appear, pH, in a case where the surface zeta potential is zero, is obtained by interpolation by using a straight line (linear function) showing a relationship between the surface zeta potential and pH of each of the two measurement points. Meanwhile, in a case where all of the surface zeta potentials obtained during the decrease of pH from 9 to 3 is positive value, pH, in a case where the surface zeta potential is zero, is obtained by extrapolation by using a straight line (linear function) showing a relationship between the surface zeta potential and pH of the 13th measurement point (pH of 3) which is the final measurement point and the 12th measurement point. On the other hand, in a case where all of the surface zeta potentials obtained during the decrease of pH from 9 to 3 is negative value, pH, in a case where the surface zeta potential is zero, is obtained by extrapolation by using a straight line (linear function) showing a relationship between the surface zeta potential and pH of the first measurement point (pH of 9) which is the initial measurement point and the 12th measurement point. By doing so, the value of pH, in a case where the surface zeta potential of the magnetic layer measured by the flow potential method is zero, is obtained.

The above measurement is performed three times in total at room temperature by using different samples cut out from the magnetic recording medium after the pressing, and pH, in a case where the surface zeta potential of each measurement is zero, is obtained. For the viscosity and the relative dielectric constant of the electrolyte, a measurement value at room temperature is used. In the invention and the specification, the "room temperature" is in a range of 20° C. to 27° C. In regard to the magnetic layer, an arithmetical mean of three pHs obtained as described above is an isoelectric point of the surface zeta potential of the magnetic layer after the pressing of the magnetic recording medium which is a measurement target. As the electrolyte having pH of 9, an electrolyte obtained by adjusting pH of a KCl aqueous solution having a concentration of 1 mmol/L to 9 by using a KOH aqueous solution having a concentration of 0.1 mol/L is used. As the electrolyte having other pH, an electrolyte obtained by adjusting pH of the electrolyte having pH of 9, which is adjusted as described above, by using an HCl aqueous solution having a concentration of 0.1 mol/L is used. The isoelectric point of the surface zeta potential measured by the above method is the isoelectric point obtained regarding the surface of the magnetic layer after the pressing.

Scraps (may be referred to as debris) may be generated due to chipping of the surface of the magnetic layer due to the contact between the surface of the magnetic layer and the magnetic head, in a case of reproducing the data recorded on the magnetic recording medium. It is thought that, in a case where the scraps are strongly stuck to the surface of the magnetic layer in a case of reproducing the data recorded on the magnetic recording medium after the long-term storage, a contact state between the surface of the magnetic layer and the magnetic head is not stabilized, thereby deteriorating the running stability. On the other hand, it is thought that, in the magnetic recording medium in a range of acidic pH in which the isoelectric point of the surface zeta potential of the magnetic layer after pressing (that is, the isoelectric point of the surface zeta potential of the magnetic layer placed in a state corresponding to the long-term storage) is equal to or less than 3.8 or less, a repulsive force may be easily applied between the scraps generated from the magnetic layer and the surface of the magnetic layer. The inventors have surmised that the preventing the scraps from being strongly stuck to the surface of the magnetic layer by this repulsive force, in a case of reproducing the data recorded on the magnetic recording medium after the long-term storage, may contribute to improvement of running stability after the long-term storage.

From a viewpoint of further improving the running stability after long-term storage, the isoelectric point of the surface zeta potential of the magnetic layer after pressing is preferably equal to or less than 3.7, more preferably equal to or less than 3.6, even more preferably equal to or less than 3.5, still preferably equal to or less than 3.4, and still more preferably equal to or less than 3.3.

As will be described later in detail, the isoelectric point of the surface zeta potential of the magnetic layer after pressing can be controlled by the kind of a component used for forming the magnetic layer, a formation step of the magnetic layer, and the like. From a viewpoint of availability of the component used for forming the magnetic layer (for example, binding agent), the isoelectric point of the surface zeta potential of the magnetic layer is preferably equal to or more than 2.5, more preferably equal to or more than 2.6, and even more preferably equal to or more than 2.7.

However, the invention is not limited to the above surmise and other surmises described in this specification.

Hereinafter, the magnetic recording medium will be further described in detail.

Magnetic Layer

Ferromagnetic Powder

As the ferromagnetic powder included in the magnetic layer, a well-known ferromagnetic powder used as one kind or in combination of two or more kinds can be used as the ferromagnetic powder used in the magnetic layer of various magnetic recording media. It is preferable to use ferromagnetic powder having a small average particle size, from a viewpoint of improvement of recording density. From this viewpoint, an average particle size of the ferromagnetic powder is preferably 50 nm or less, more preferably 45 nm or less, even more preferably 40 nm or less, further more preferably 35 nm or less, and still preferably 30 nm or less, still more preferably 25 nm or less, and still even more preferably 20 nm or less. On the other hand, from a viewpoint of magnetization stability, the average particle size of the ferromagnetic powder is preferably 5 nm or more, more preferably 8 nm or more, even more preferably 10 nm or more, still preferably 15 nm or more, and still more preferably 20 nm.

Hexagonal Ferrite Powder

As a preferred specific example of the ferromagnetic powder, hexagonal ferrite powder can be used. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the invention and the specification, the "hexagonal ferrite powder" is a ferromagnetic powder in which a hexagonal ferrite type crystal structure is detected as a main phase by X-ray diffraction analysis. The main phase is a structure to which a diffraction peak at the highest intensity in an X-ray diffraction spectrum obtained by the X-ray diffraction analysis belongs. For example, in a case where the diffraction peak at the highest intensity in the X-ray diffraction spectrum obtained by the X-ray diffraction analysis belongs to a hexagonal ferrite type crystal structure, it is determined that the hexagonal ferrite type crystal structure is detected as a main phase. In a case where only a single structure is detected by the X-ray diffraction analysis, this detected structure is set as a main phase. The hexagonal ferrite type crystal structure includes at least an iron atom, a divalent metal atom, and an oxygen atom as constituting atoms. A divalent metal atom is a metal atom which can be divalent cations as ions, and examples thereof include an alkali earth metal atom such as a strontium atom, a barium atom, or a calcium atom, and a lead atom. In the invention and the specification, the hexagonal strontium ferrite powder is powder in which a main divalent metal atom included in this powder is a strontium atom, and the hexagonal barium ferrite powder is a powder in which a main divalent metal atom included in this powder is a barium atom. The main divalent metal atom is a divalent metal atom occupying the greatest content in the divalent metal atom included in the powder based on atom %. However, the divalent metal atom described above does not include rare earth atom. The "rare earth atom" of the invention and the specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder which is one embodiment of the hexagonal ferrite powder will be described more specifically.

An activation volume of the hexagonal strontium ferrite powder is preferably 800 to 1600 $nm^3$. The atomized hexagonal strontium ferrite powder showing the activation volume in the range described above is suitable for manufacturing a magnetic recording medium exhibiting excellent electromagnetic conversion characteristics. The activation volume of the hexagonal strontium ferrite powder is preferably equal to or greater than 800 $nm^3$, and can also be, for example, equal to or greater than 850 $nm^3$. In addition, from a viewpoint of further improving the electromagnetic conversion characteristics, the activation volume of the hexagonal strontium ferrite powder is more preferably equal to or smaller than 1500 $nm^3$, even more preferably equal to or smaller than 1400 $nm^3$, still preferably equal to or smaller than 1300 nm³, still more preferably equal to or smaller than 1200 nm³, and still even more preferably equal to or smaller than 1100 nm³. The same applies to the activation volume of the hexagonal barium ferrite powder.

The "activation volume" is a unit of magnetization reversal and an index showing a magnetic magnitude of the particles. Regarding the activation volume and an anisotropy constant Ku which will be described later disclosed in the invention and the specification, magnetic field sweep rates of a coercivity He measurement part at time points of 3 minutes and 30 minutes are measured by using an oscillation sample type magnetic-flux meter (measurement temperature: 23° C.×1° C.), and the activation volume and the anisotropy constant Ku are values acquired from the following relational expression of He and an activation volume V. A unit of the anisotropy constant Ku is 1 erg/cc=1.0×10⁻¹ J/m³.

$$He=2Ku/Ms\{1-[(kT/KuV)\ln(At/0.693)]^{1/2}\}$$

[In the expression, Ku: anisotropy constant (unit: J/m³), Ms: saturation magnetization (unit: kA/m), k: Boltzmann's constant, T: absolute temperature (unit: K), V: activation volume (unit: cm³), A: spin precession frequency (unit: s⁻¹), and t: magnetic field reversal time (unit: s)]

The anisotropy constant Ku can be used as an index of reduction of thermal fluctuation, that is, improvement of thermal stability. The hexagonal strontium ferrite powder can preferably have Ku equal to or greater than 1.8×105 J/m³, and more preferably have Ku equal to or greater than 2.0×105 J/m³. In addition, Ku of the hexagonal strontium ferrite powder can be, for example, equal to or smaller than 2.5×105 J/m³. However, the high Ku is preferable, because it means high thermal stability, and thus, Ku is not limited to the exemplified value.

The hexagonal strontium ferrite powder may or may not include the rare earth atom. In a case where the hexagonal strontium ferrite powder includes the rare earth atom, a content (bulk content) of the rare earth atom is preferably 0.5 to 5.0 atom % with respect to 100 atom % of the iron atom. In one embodiment, the hexagonal strontium ferrite powder including the rare earth atom can have rare earth atom surface layer portion uneven distribution. The "rare earth atom surface layer portion uneven distribution" of the invention and the specification means that a content of rare earth atom with respect to 100 atom % of iron atom in a solution obtained by partially dissolving the hexagonal strontium ferrite powder with acid (hereinafter, referred to as a "rare earth atom surface layer portion content" or simply a "surface layer portion content" regarding the rare earth atom) and a content of rare earth atom with respect to 100 atom % of iron atom in a solution obtained by totally dissolving the hexagonal strontium ferrite powder with acid (hereinafter, referred to as a "rare earth atom bulk content" or simply a "bulk content" regarding the rare earth atom) satisfy a ratio of rare earth atom surface layer portion content/rare earth atom bulk content >1.0.

The content of rare earth atom of the hexagonal strontium ferrite powder which will be described later is identical to the rare earth atom bulk content. With respect to this, the partial dissolving using acid is to dissolve the surface layer portion of particles configuring the hexagonal strontium ferrite powder, and accordingly, the content of rare earth atom in the solution obtained by the partial dissolving is the content of rare earth atom in the surface layer portion of the particles configuring the hexagonal strontium ferrite powder. The rare earth atom surface layer portion content satisfying a ratio of "rare earth atom surface layer portion content/rare earth atom bulk content >1.0" means that the rare earth atoms are unevenly distributed in the surface layer portion (that is, a larger amount of the rare earth atoms is present, compared to that inside), among the particles configuring the hexagonal strontium ferrite powder. The surface layer portion of the invention and the specification means a part of the region of the particles configuring the hexagonal strontium ferrite powder from the inside from the surface.

In a case where the hexagonal strontium ferrite powder includes the rare earth atom, a content (bulk content) of the rare earth atom is preferably 0.5 to 5.0 atom % with respect to 100 atom % of the iron atom. It is thought that the hexagonal strontium ferrite powder including the rare earth atom having the bulk content in the range described above and uneven distribution of the rare earth atom in the surface layer portion of the particles configuring the hexagonal strontium ferrite powder contribute to the prevention of reduction of reproduction output during the repeated reproduction. It is surmised that this is because the anisotropy constant Ku can be increased due to the hexagonal strontium ferrite powder including the rare earth atom having the bulk content in the range described above and uneven distribution of the rare earth atom in the surface layer portion of the particles configuring the hexagonal strontium ferrite powder. As the value of the anisotropy constant Ku is high, occurrence of a phenomenon, so-called thermal fluctuation can be prevented (that is, thermal stability can be improved). By preventing the occurrence of thermal fluctuation, it is possible to prevent reduction of the reproduction output during the repeated reproduction. It is surmised that, the uneven distribution of the rare earth atom in the particle surface layer portion of the hexagonal strontium ferrite powder contributes to stabilization of a spin at an iron (Fe) site in a crystal lattice of the surface layer portion, thereby increasing the anisotropy constant Ku.

It is surmised that the use of the hexagonal strontium ferrite powder having the rare earth atom surface layer portion uneven distribution as the ferromagnetic powder of the magnetic layer contributes to the prevention of chipping of the surface of the magnetic layer due to the sliding with the magnetic head. That is, it is surmised that the hexagonal strontium ferrite powder having the rare earth atom surface layer portion uneven distribution also contributes to the improvement of running durability of the magnetic recording medium. It is surmised that this is because the uneven distribution of the rare earth atom on the surface of the particles configuring the hexagonal strontium ferrite powder contributes to improvement of an interaction between the surface of the particles and an organic substance (for example, binding agent and/or additive) included in the magnetic layer, thereby improving hardness of the magnetic layer.

From a viewpoint of further preventing reduction of the reproduction output in the repeated reproduction and/or a viewpoint of further improving running durability, the content of rare earth atom (bulk content) is more preferably 0.5 to 4.5 atom %, even more preferably 1.0 to 4.5 atom %, and still preferably 1.5 to 4.5 atom %.

The bulk content is a content obtained by totally dissolving the hexagonal strontium ferrite powder. In the invention and the specification, the content of the atom is a bulk content obtained by totally dissolving the hexagonal strontium ferrite powder, unless otherwise noted. The hexagonal strontium ferrite powder including the rare earth atom may include only one kind of rare earth atom or may include two or more kinds of rare earth atom, as the rare earth atom. In a case where two or more kinds of rare earth atom are included, the bulk content is obtained from the total of the two or more kinds of rare earth atom. The same also applies to the other components of the invention and the specification. That is, for a given component, only one kind may be used or two or more kinds may be used, unless otherwise noted. In a case where two or more kinds are used, the content is a content of the total of the two or more kinds.

In a case where the hexagonal strontium ferrite powder includes the rare earth atom, the rare earth atom included therein may be any one or more kinds of the rare earth atom. Examples of the rare earth atom preferable from a viewpoint of further preventing reduction of the reproduction output during the repeated reproduction include a neodymium atom, a samarium atom, an yttrium atom, and a dysprosium atom, a neodymium atom, a samarium atom, an yttrium atom are more preferable, and a neodymium atom is even more preferable.

In the hexagonal strontium ferrite powder having the rare earth atom surface layer portion uneven distribution, a degree of uneven distribution of the rare earth atom is not limited, as long as the rare earth atom is unevenly distributed in the surface layer portion of the particles configuring the hexagonal strontium ferrite powder. For example, regarding the hexagonal strontium ferrite powder having the rare earth atom surface layer portion uneven distribution, a ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" is greater than 1.0 and can be equal to or greater than 1.5. The "surface layer portion content/bulk content" greater than 1.0 means that the rare earth atom is unevenly distributed in the surface layer portion (that is, a larger amount of the rare earth atoms is present, compared to that inside), among the particles configuring the hexagonal strontium ferrite powder. In addition, the ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, in the hexagonal strontium ferrite powder having the rare earth atom surface layer portion uneven distribution, the "surface layer portion content/bulk content" is not limited to the exemplified upper limit or the lower limit, as long as the rare earth atom is unevenly distributed in the surface layer portion of the particles configuring the hexagonal strontium ferrite powder.

The partial dissolving and the total dissolving of the hexagonal strontium ferrite powder will be described below. Regarding the hexagonal strontium ferrite powder present as the powder, sample powder for the partial dissolving and the total dissolving are collected from powder of the same lot. Meanwhile, regarding the hexagonal strontium ferrite powder included in a magnetic layer of a magnetic recording medium, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by a method disclosed in a paragraph 0032 of JP2015-091747A.

The partial dissolving means dissolving performed so that the hexagonal strontium ferrite powder remaining in the solution can be visually confirmed at the time of the completion of the dissolving. For example, by performing the partial dissolving, a region of the particles configuring the hexagonal strontium ferrite powder which is 10% to 20% by mass with respect to 100% by mass of a total of the particles can be dissolved. On the other hand, the total dissolving means dissolving performed until the hexagonal strontium ferrite powder remaining in the solution is not visually confirmed at the time of the completion of the dissolving.

The partial dissolving and the measurement of the surface layer portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 ml of hydrochloric acid having a concentration of 1 mol/L is held on a hot plate at a set temperature of 70° C. for 1 hour. The obtained solution is filtered with a membrane filter having a hole diameter of 0.1 µm. The element analysis of the filtrate obtained as described above is performed by an inductively coupled plasma (ICP) analysis device. By doing so, the rare earth atom surface layer portion content with respect to 100 atom % of the iron atom can be obtained. In a case where a plurality of kinds of rare earth atoms are detected from the element analysis, a total content of the entirety of the rare earth atoms is the surface layer portion content. The same applies to the measurement of the bulk content.

Meanwhile, the total dissolving and the measurement of the bulk content are, for example, performed by the following method.

A vessel (for example, beaker) containing 12 mg of sample powder and 10 ml of hydrochloric acid having a concentration of 4 mol/L is held on a hot plate at a set temperature of 80° C. for 3 hours. After that, the process is performed in the same manner as in the partial dissolving and the measurement of the surface layer portion content, and the bulk content with respect to 100 atom % of the iron atom can be obtained.

From a viewpoint of increasing reproducing output in a case of reproducing data recorded on a magnetic recording medium, it is desirable that the mass magnetization as of ferromagnetic powder included in the magnetic recording medium is high. In regards to this point, in hexagonal strontium ferrite powder which includes the rare earth atom but does not have the rare earth atom surface layer portion uneven distribution, σs tends to significantly decrease, compared to that in hexagonal strontium ferrite powder not including the rare earth atom. With respect to this, it is thought that the hexagonal strontium ferrite powder having the rare earth atom surface layer portion uneven distribution is preferable for preventing such a significant decrease in σs. In one embodiment, σs of the hexagonal strontium ferrite powder can be equal to or greater than 45 A·m$^2$/kg and can also be equal to or greater than 47 A·m$^2$/kg. On the other hand, from a viewpoint of noise reduction, σs is preferably equal to or smaller than 80 A·m$^2$/kg and more preferably equal to or smaller than 60 A·m$^2$/kg. σs can be measured by using a well-known measurement device capable of measuring magnetic properties such as an oscillation sample type magnetic-flux meter. In the invention and the specification, the mass magnetization σs is a value measured at a magnetic field strength of 15 kOe, unless otherwise noted. 1 [kOe]=($10^6/4\pi$) [A/m]

Regarding the content (bulk content) of the constituting atom in the hexagonal strontium ferrite powder, a content of the strontium atom can be, for example, 2.0 to 15.0 atom % with respect to 100 atom % of the iron atom. In one embodiment, in the hexagonal strontium ferrite powder, the divalent metal atom included in this powder can be only a strontium atom. In another embodiment, the hexagonal strontium ferrite powder can also include one or more kinds of other divalent metal atoms, in addition to the strontium atom. For example, a barium atom and/or a calcium atom can be included. In a case where the other divalent metal atom other than the strontium atom is included, a content of a barium atom and a content of a calcium atom in the hexagonal strontium ferrite powder respectively can be, for example, 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structure can be detected by the X-ray diffraction analysis. For example, in one embodiment, in the hexagonal strontium ferrite powder, only the M type crystal structure can be detected by the X-ray diffraction analysis. For example, the M type hexagonal ferrite is represented by a compositional formula of $AFe_{12}O_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, and an oxygen atom, and can further include a rare earth atom. In addition, the hexagonal strontium ferrite powder may or may not include atoms other than these atoms. As an example the hexagonal strontium ferrite powder may include an aluminum atom (Al). A content of the aluminum atom can be, for example, 0.5 to 10.0 atom % with respect to 100 atom % of the iron atom. From a viewpoint of further preventing the reduction of the reproducing output during the repeated reproduction, the hexagonal strontium ferrite powder includes the iron atom, the strontium atom, the oxygen atom, and the rare earth atom, and a content of the atoms other than these atoms is preferably equal to or smaller than 10.0 atom %, more preferably 0 to 5.0 atom %, and may be 0 atom % with respect to 100 atom % of the iron atom. That is, in one embodiment, the hexagonal strontium ferrite powder may not include atoms other than the iron atom, the strontium atom, the oxygen atom, and the rare earth atom. The content shown with atom % described above is obtained by converting a value of the content (unit: % by mass) of each atom obtained by totally dissolving the hexagonal strontium ferrite powder into a value shown as atom % by using the atomic weight of each atom. In addition, in the invention and the specification, a given atom which is "not included" means that the content thereof obtained by performing total dissolving and measurement by using an ICP analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device. In one embodiment, the hexagonal strontium ferrite powder does not include a bismuth atom (Bi).

Metal Powder

As a preferred specific example of the ferromagnetic powder, ferromagnetic metal powder can also be used. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

As a preferred specific example of the ferromagnetic powder, an ε-iron oxide powder can also be used. In the invention and the specification, the "ε-iron oxide powder" is a ferromagnetic powder in which an ε-iron oxide type crystal structure is detected as a main phase by X-ray diffraction analysis. For example, in a case where the diffraction peak at the highest intensity in the X-ray diffraction spectrum obtained by the X-ray diffraction analysis belongs to an ε-iron oxide type crystal structure, it is determined that the ε-iron oxide type crystal structure is detected as a main phase. As a producing method of the ε-iron oxide powder, a producing method from a goethite, and a reverse micelle method are known. All of the producing methods is well known. For example, for a method of producing the F-iron oxide powder in which a part of Fe is substituted with a substitutional atom such as Ga, Co, Ti, Al, or Rh, a description disclosed in J. Jpn. Soc. Powder Metallurgy Vol. 61 Supplement, No. S1, pp. S280-S284, J. Mater. Chem. C, 2013, 1, pp. 5200-5206 can be referred to, for example. However, the producing method of the ε-iron oxide powder which can be used as the ferromagnetic powder in the magnetic layer of the magnetic recording medium is not limited to the method described here.

The activation volume of the ε-iron oxide powder is preferably in a range of 300 to 1500 $nm^3$. The atomized ε-iron oxide powder showing the activation volume in the range described above is suitable for manufacturing a magnetic recording medium exhibiting excellent electromagnetic conversion characteristics. The activation volume of the δ-iron oxide powder is preferably equal to or greater than 300 $nm^3$, and can also be, for example, equal to or greater than 500 $nm^3$. In addition, from a viewpoint of further improving the electromagnetic conversion characteristics, the activation volume of the ε-iron oxide powder is more preferably equal to or smaller than 1400 $nm^3$, even more preferably equal to or smaller than 1300 $nm^3$, still preferably equal to or smaller than 1200 $nm^3$, and still more preferably equal to or smaller than 1100 $nm^3$.

The anisotropy constant Ku can be used as an index of reduction of thermal fluctuation, that is, improvement of thermal stability. The ε-iron oxide powder can preferably have Ku equal to or greater than $3.0 \times 10^4$ $J/m^3$, and more preferably have Ku equal to or greater than $8.0 \times 10^4$ $J/m^3$. In addition, Ku of the ε-iron oxide powder can be, for example, equal to or smaller than $3.0 \times 10^5$ $J/m^3$. However, the high Ku is preferable, because it means high thermal stability, and thus, Ku is not limited to the exemplified value.

From a viewpoint of increasing reproducing output in a case of reproducing data recorded on a magnetic recording medium, it is desirable that the mass magnetization as of ferromagnetic powder included in the magnetic recording medium is high. In regard to this point, in one embodiment, σs of the ε-iron oxide powder can be equal to or greater than 8 A·m²/kg and can also be equal to or greater than 12 A·m²/kg. On the other hand, from a viewpoint of noise reduction, σs of the ε-iron oxide powder is preferably equal to or smaller than 40 A·m²/kg and more preferably equal to or smaller than 35 A·m²/kg.

In the invention and the specification, average particle sizes of various powder such as the ferromagnetic powder and the like are values measured by the following method with a transmission electron microscope, unless otherwise noted.

The powder is imaged at an imaging magnification ratio of 100,000 with a transmission electron microscope, the image is printed on photographic printing paper so that the total magnification ratio of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of a plurality of particles is not limited to an embodiment in which particles configuring the aggregate directly come into contact with each other, but also includes an embodiment in which a binding agent, an additive, or the like which will be described later is interposed between the particles. A term, particles may be used for representing the powder.

As a method of collecting a sample powder from the magnetic recording medium in order to measure the particle size, a method disclosed in a paragraph 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably 50% to 90% by mass and more preferably 60% to 90% by mass. A high filling percentage of the ferromagnetic powder in the magnetic layer is preferable from a viewpoint of improvement of recording density.

Binding Agent

The magnetic recording medium can be a coating type magnetic recording medium, and can include a binding agent in the magnetic layer. The binding agent is one or more kinds of resin. As the binding agent, various resins generally used as the binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. The resin may be a homopolymer or a copolymer. These resins can be used as the binding agent even in the non-magnetic layer and/or a back coating layer which will be described later.

For the binding agent described above, description disclosed in paragraphs 0028 to 0031 of JP2010-024113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC) under the following measurement conditions. The weight-average molecular weight of the binding agent shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)' 30.0 cm)

Eluent: Tetrahydrofuran (THF)

In one embodiment, as the binding agent, a binding agent including an acidic group can be used. The "acidic group" of the invention and the specification is used as a meaning including a state of a group capable of emitting $H^+$ in water or a solvent including water (aqueous solvent) to dissociate anions and salt thereof. Specific examples of the acidic group include a sulfonic acid group, a sulfuric acid group, a carboxy group, a phosphoric acid group, and salt thereof. For example, salt of sulfonic acid group ($-SO_3H$) is represented by $-SO_3M$, and M represents a group representing an atom (for example, alkali metal atom or the like) which may be cations in water or in an aqueous solvent. The same applies to embodiments of salt of various groups described above. As an example of the binding agent including the acidic group, a resin including at least one kind of acidic group selected from the group consisting of a sulfonic acid group and salt thereof (for example, a polyurethane resin or a vinyl chloride resin) can be used. However, the resin included in the magnetic layer is not limited to these resins. In addition, in the binding agent including the acidic group, a content of the acidic group can be, for example, 0.03 to 0.50 meq/g. "eq" indicates equivalent and is a unit not convertible into SI unit. The content of various functional groups such as the acidic group included in the resin can be obtained by a well-known method in accordance with the kind of the functional group. The amount of the binding agent used in a magnetic layer forming composition can be, for example, 1.0 to 30.0 parts by mass with respect to 100.0 parts by mass of the ferromagnetic powder.

In regards to the controlling of the isoelectric point of the surface zeta potential of the magnetic layer, it is surmised that formation of the magnetic layer so that the acidic component is unevenly distributed to a surface layer portion of the magnetic layer contributes to a decrease in value of the isoelectric point. In addition, it is surmised that formation of the magnetic layer so as to decrease the amount of a basic component present in the surface layer portion of the magnetic layer also contributes to a decrease in value of the isoelectric point. However, even in a case where such a magnetic layer is formed, in a case where the acidic component unevenly distributed to the surface layer portion of the magnetic layer is moved into the magnetic layer, and/or the basic component moves from the inside of the magnetic layer to the surface layer portion, by pressing the surface of the magnetic layer during the long-term storage, the value of the isoelectric point of the surface zeta potential of the magnetic layer may be increased after the long-term storage. In contrast, the isoelectric point of the surface zeta potential of the magnetic layer after the pressing (that is, the isoelectric point of the surface zeta potential of the magnetic layer placed in a state corresponding to the long-term storage) can be equal to or less than 3.8, for example, by using a projection formation agent which will be described later. The inventors have surmised that this can improve running stability after long-term storage. The acidic component is used as a meaning including a state of a component capable of emitting $H^+$ in water or an aqueous solvent to dissociate anions and salt thereof. The basic component is used as a meaning including a state of a component capable of emitting $OH^-$ in water or an aqueous solvent to dissociate cations and salt thereof. For example, it is thought that, in a case of using the acidic component, the unevenly distributing of the acidic component to a surface layer portion of the magnetic layer contributes to a decrease of the value of the isoelectric point of the surface zeta potential of the magnetic layer to control it to be equal to or less than 3.8. For example, it is thought that, in a step of applying a magnetic layer forming composition onto a non-magnetic support directly or through a non-magnetic layer, the applying which is performed in an alternating magnetic field by applying an alternating magnetic field contributes to the formation of the magnetic layer with the uneven distribution of the acidic component to the surface layer portion. As the acidic component, for example, a binding agent including an acidic group can be used. In addition, it is surmised that, in a case of using the binding agent including an acidic group, in a preparation step of the magnetic layer forming composition, the addition (additional addition) of the binding agent even in a case of preparing a dispersion liquid (magnetic liquid) including ferromagnetic powder and the binding agent and then mixing the magnetic liquid with other components, contributes to formation of a magnetic layer in which the binding agent including the acidic group is unevenly distributed to the surface layer portion. The formation of the magnetic layer will be described later more specifically.

In addition, a curing agent can also be used together with the resin which can be used as the binding agent. As the curing agent, in one embodiment, a thermosetting compound which is a compound in which a curing reaction (crosslinking reaction) proceeds due to heating can be used, and in another embodiment, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of the magnetic layer.

Additives

The magnetic layer may include one or more kinds of additives, as necessary, together with the various components described above. As the additives, a commercially available product can be suitably selected and used according to the desired properties. Alternatively, a compound synthesized by a well-known method can be used as the additives. As the additives, the curing agent described above is used as an example. In addition, examples of the additive included in the magnetic layer include a non-magnetic filler, a lubricant, a dispersing agent, a dispersing assistant, an antibacterial agent, an antistatic agent, and an antioxidant. The non-magnetic filler is identical to the non-magnetic particles or non-magnetic powder. As the non-magnetic filler, a non-magnetic filler which can function as a projection formation agent and a non-magnetic filler which can function as an abrasive can be used. As the additive, a well-known additive such as various polymers disclosed in paragraphs 0030 to 0080 of JP2016-051493A can also be used.

Projection Formation Agent

As the projection formation agent which is one embodiment of the non-magnetic filler, particles of an inorganic substance can be used, particles of an organic substance can be used, and composite particles of the inorganic substance and the organic substance can also be used. Examples of the inorganic substance include inorganic oxide such as metal oxide, metal carbonate, metal sulfate, metal nitride, metal carbide, and metal sulfide, and inorganic oxide is preferable. In one embodiment, the projection formation agent can be inorganic oxide-based particles. Here, "-based" means "-containing". One embodiment of the inorganic oxide-based particles is particles consisting of inorganic oxide. Another embodiment of the inorganic oxide-based particles is composite particles of inorganic oxide and an organic substance, and as a specific example, composite particles of inorganic oxide and a polymer can be used. As such particles, for example, particles obtained by binding a polymer to a surface of the inorganic oxide particle can be used.

An average particle size of the projection formation agent is, for example, 30 to 300 nm and is preferably 40 to 200 nm. As the shape of the particles is a shape close to a sphere, indentation resistance exerted during a large pressure is applied is small, and accordingly, the particles are easily pushed into the magnetic layer. With respect to this, in a case where the shape of the particles is a shape other than the sphere, for example, a shape of a so-called deformed shape, a large indentation resistance is easily exerted, in a case where a large pressure is applied, and accordingly, particles are hardly pushed into the magnetic layer. In addition, regarding the particles having a low surface smoothness in which a surface of the particle is not even, the indentation resistance is easily exerted, in a case where a large pressure is applied, and accordingly, the particles are hardly pushed into the magnetic layer. It is thought that, in a case where the particles which are easily pushed into the magnetic layer are included in the magnetic layer, the acidic components unevenly distributed to the surface layer portion of the magnetic layer may move to the inside of the magnetic layer and/or the basic component may move from the inside of the magnetic layer to the surface layer portion, due to the particles pushed into the magnetic layer due to pressure. On the other hand, it is surmised that, in a case where the particles of the projection formation agent are hardly pushed into the magnetic layer by pressing, it is possible to prevent the acidic component unevenly distributed to the surface layer portion of the magnetic layer from moving into the magnetic layer and/or the basic component from moving from the inside of the magnetic layer to the surface layer. That is, it is surmised that the use of the projection formation agent hardly pushed into the magnetic layer by pressing contributes to controlling the isoelectric point of the surface zeta potential of the magnetic layer after pressing to be equal to or less than 3.8.

Abrasive

The abrasive which is another embodiment of the non-magnetic filler is preferably a non-magnetic powder having Mohs hardness exceeding 8 and more preferably a non-magnetic powder having Mohs hardness equal to or greater than 9. With respect to this, the Mohs hardness of the projection formation agent can be, for example, equal to or smaller than 8 or equal to or smaller than 7. A maximum value of Mohs hardness is 10 of diamond. Specific examples thereof include powders of alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, diamond, and the like, and among these, alumina powder such as α-alumina and silicon carbide powder are preferable. An average particle size of the abrasive is, for example, in a range of 30 to 300 nm and preferably in a range of 50 to 200 nm.

From a viewpoint of causing the projection formation agent and the abrasive to exhibit these functions in more excellent manner, a content of the projection formation agent in the magnetic layer is preferably 1.0 to 4.0 parts by mass and more preferably 1.5 to 3.5 parts by mass, with respect to 100.0 parts by mass of the ferromagnetic powder. Meanwhile, a content of the abrasive in the magnetic layer is preferably 1.0 to 20.0 parts by mass, more preferably 3.0 to 15.0 parts by mass, and even more preferably 4.0 to 10.0 parts by mass, with respect to 100.0 parts by mass of the ferromagnetic powder.

As an example of the additive which can be used in the magnetic layer including the abrasive, a dispersing agent disclosed in paragraphs 0012 to 0022 of JP2013-131285A can be used as a dispersing agent for improving dispersibility of the abrasive in the magnetic layer forming composition. In addition, for the dispersing agent, a description disclosed in paragraphs 0061 and 0071 of JP2012-133837A can be referred to. The dispersing agent may be included in the non-magnetic layer. For the dispersing agent which may be included in the non-magnetic layer, a description disclosed in a paragraph 0061 of JP2012-133837A can be referred to. In addition, for example, for the lubricant, a description disclosed in paragraphs 0030 to 0033, 0035, and 0036 of JP2016-126817A can be referred to. The non-magnetic layer may include the lubricant. For the lubricant which may be included in the non-magnetic layer, a description disclosed in paragraphs 0030, 0031, 0034, 0035, and 0036 of JP2016-126817A can be referred to.

The magnetic layer described above can be provided on the surface of the non-magnetic support directly or indirectly through the non-magnetic layer.

Non-Magnetic Layer

Next, the non-magnetic layer will be described. The magnetic recording medium may include a magnetic layer directly on the non-magnetic support or may include a non-magnetic layer including the non-magnetic powder between the non-magnetic support and the magnetic layer. The non-magnetic powder used in the non-magnetic layer may be powder of an inorganic substance or powder of an organic substance. In addition, carbon black and the like can be used. Examples of the inorganic substance include metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black capable of being used in the non-magnetic layer, a description disclosed in paragraphs 0040 and 0041 of JP2010-024113A can be referred to. The content (filling percentage) of the non-magnetic powder of the non-magnetic layer is preferably 50% to 90% by mass and more preferably 60% to 90% by mass.

The non-magnetic layer can include a binding agent and can also include additives. In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 100 Oe, or a layer having a residual magnetic flux density equal to or smaller than 10 mT and coercivity equal to or smaller than 100 Oe. It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Back Coating Layer

The magnetic recording medium may or may not include a back coating layer including a non-magnetic powder on a surface of the non-magnetic support opposite to the surface provided with the magnetic layer. The back coating layer preferably includes any one or both of carbon black and inorganic powder. The back coating layer can include a binding agent and can also include additives. In regards to the binding agent included in the back coating layer and various additives, a well-known technology regarding the back coating layer can be applied, and a well-known technology regarding the list of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Various Thicknesses

A thickness of the non-magnetic support is preferably 3.00 to 20.00 μm, more preferably 3.00 to 10.00 μm, and even more preferably 3.00 to 6.00 μm.

A thickness of the magnetic layer can be optimized according to a saturation magnetization amount of a magnetic head used, a head gap length, a recording signal band, and the like. The thickness of the magnetic layer is generally 0.01 μm to 0.15 μm, preferably 0.02 μm to 0.12 μm, and more preferably 0.03 μm to 0.10 μm, from a viewpoint of realization of high-density recording. The magnetic layer may be at least one layer, or the magnetic layer can be separated to two or more layers having magnetic properties, and a configuration regarding a well-known multilayered magnetic layer can be applied. A thickness of the magnetic layer which is separated into two or more layers is a total thickness of the layers.

A thickness of the non-magnetic layer is, for example, 0.10 to 1.50 μm and preferably 0.10 to 1.00 μm.

A thickness of the back coating layer is preferably equal to or smaller than 0.90 μm and even more preferably 0.10 to 0.70 μm.

The thicknesses of various layers and the non-magnetic support of the magnetic recording medium can be obtained by a well-known film thickness measurement method. As an example, a cross section of the magnetic recording medium in a thickness direction is exposed by a well-known method of ion beams or microtome, and the exposed cross section is observed with a scanning electron microscope. In the cross section observation, various thicknesses can be obtained as the thickness obtained at one portion, or as an arithmetical mean of thicknesses obtained at a plurality of portions which are two or more portions randomly extracted, for example, two portions. Alternatively, the thickness of each layer may be obtained as a designed thickness calculated under the manufacturing conditions.

Manufacturing Step

Preparation of Each Layer Forming Composition

Composition for forming the magnetic layer, the non-magnetic layer, or the back coating layer generally include a solvent, together with the various components described above. As the solvent, various organic solvents generally used for manufacturing a coating type magnetic recording medium can be used. The amount of solvent in each layer forming composition is not particularly limited, and can be identical to that in each layer forming composition of a typical coating type magnetic recording medium. A step of preparing the composition for forming each layer can generally include at least a kneading step, a dispersing step, and a mixing step provided before and after these steps, as necessary. Each step may be divided into two or more stages. Components used in the preparation of each layer forming composition may be added at the beginning or during any step. In addition, each component may be separately added in two or more steps. For example, in the preparation of the magnetic layer forming composition, the binding agent including an acidic group can be separately added through two or more steps. It is preferable that a dispersion liquid is prepared by mixing some components including the ferromagnetic powder among the various components of the magnetic layer forming composition with the binding agent including an acidic group and dispersing the mixture in a solvent, and the binding agent including an acidic group is also added in a step of mixing the dispersion liquid with the remaining components and performing dispersing, because it is possible to contribute to the controlling of the isoelectric point of a surface zeta potential of the magnetic layer to be equal to or less than 3.8.

In order to prepare each layer forming composition, a well-known technology can be used. In the kneading step, an open kneader, a continuous kneader, a pressure kneader, or a kneader having a strong kneading force such as an extruder is preferably used. For details of the kneading processes, descriptions disclosed in JP1989-106338A (JP-H1-106338A) and JP1989-079274A (JP-H1-079274A) can be referred to. In addition, in order to disperse each layer forming composition, one or more kinds of dispersion beads selected from the group consisting of glass beads and other dispersion beads can be used as a dispersion medium. As such dispersion beads, zirconia beads, titania beads, and steel beads which are dispersion beads having high specific gravity are suitable. These dispersion beads may be used by optimizing a particle diameter (bead diameter) and a filling percentage of the dispersion beads. As a disperser, a well-known disperser can be used. Each layer forming composition may be filtered by a well-known method before performing the coating step. The filtering can be performed by using a filter, for example. As the filter used in the filtering, a filter having a hole diameter of 0.01 to 3 μm (for example, filter made of glass fiber or filter made of polypropylene) can be used, for example.

In one embodiment, in the step of preparing the magnetic layer forming composition, a dispersion liquid including a projection formation agent (hereinafter, referred to as a "projection formation agent liquid") can be prepared, and then this projection formation agent liquid can be mixed with one or more other components of the magnetic layer forming composition. For example, the projection formation agent liquid, a dispersion liquid including an abrasive (hereinafter, referred to as an "abrasive solution"), and a dispersion liquid including a ferromagnetic powder (hereinafter, referred to as a "magnetic liquid") are separately prepared, mixed, and dispersed, thereby preparing the magnetic layer forming composition. It is preferable to separately prepare various dispersion liquids in order to improve the dispersibility of the ferromagnetic powder, the projection formation agent, and the abrasive in the magnetic layer forming composition. For example, the projection formation agent liquid can be prepared by a well-known dispersion process such as ultrasonic process. The ultrasonic treatment can be performed for about 1 to 300 minutes at an ultrasonic output of about 10 to 2,000 watts per 200 cc (1 cc=1 cm$^3$). In addition, the filtering may be performed after a dispersion process. For the filter used for the filtering, the above description can be referred to.

The magnetic layer can be formed, for example, by directly applying the magnetic layer forming composition onto the surface of the non-magnetic support or performing multilayer coating of the magnetic layer forming composition with the non-magnetic layer forming composition in order or at the same time. The back coating layer can be formed by applying the back coating layer forming composition to a surface of the non-magnetic support opposite to a surface provided with the magnetic layer or to be provided with the magnetic layer. For details of the coating for forming each layer, a description disclosed in a paragraph 0066 of JP2010-231843A can be referred to.

The coating of the magnetic layer forming composition performed in an alternating magnetic field can contribute to the controlling of the isoelectric point of a surface zeta potential of the magnetic layer to be equal to or less than 3.8. It is surmised that this is because, an acidic component (for example, the binding agent including an acidic group) is easily unevenly distributed to a surface layer portion of a coating layer of the magnetic layer forming composition due to the applied alternating magnetic field, and thus, by drying this coating layer, a magnetic layer in which the acidic component is unevenly distributed to the surface layer portion is obtained. The applying of the alternating magnetic field can be performed by disposing a magnet in a coating device so that the alternating magnetic field is applied vertically to the surface of the coating layer of the magnetic layer forming composition. A magnetic field strength of the alternating magnetic field can be, for example, set as approximately 0.05 to 3.00 T. However, there is no limitation to this range.

The "vertical" in the invention and the specification does not mean only a vertical direction in the strict sense, but also includes a range of errors allowed in the technical field of the invention. For example, the range of errors means a range of less than ±10° from an exact vertical direction.

For various other steps for manufacturing the magnetic recording medium, a well-known technology can be applied. For details of the various steps, descriptions disclosed in paragraphs 0067 to 0070 of JP2010-231843A can be referred to, for example. For example, it is preferable that the coating layer of the magnetic layer forming composition is subjected to an alignment process, while the coating layer is wet (not dried). For the alignment process, various well-known technologies such as descriptions disclosed in a paragraph 0067 of JP2010-231843A can be used. For example, a homeotropic alignment process can be performed by a well-known method such as a method using a different polar opposing magnet. In the alignment zone, a drying speed of the coating layer can be controlled by a temperature, an air flow of the dry air and/or a transporting rate of the magnetic tape in the alignment zone. In addition, the coating layer may be preliminarily dried before transporting to the alignment zone. In a case of performing the alignment process, it is preferable to apply a magnetic field (for example, DC magnetic field) for aligning the ferromagnetic powder with respect to the coating layer of the magnetic layer forming composition applied in the alternating magnetic field.

A servo pattern can be formed on the magnetic recording medium manufactured as described above by a well-known method, in order to realize tracking control of a magnetic head of the magnetic recording and reproducing device and control of a running speed of the magnetic recording medium. The "formation of the servo pattern" can be "recording of a servo signal". In one embodiment, the magnetic recording medium can be a tape-shaped magnetic recording medium (magnetic tape), and in another embodiment, may be a disk-shaped magnetic recording medium (magnetic disc). Hereinafter, the formation of the servo pattern will be described using a magnetic tape as an example.

The servo pattern is generally formed along a longitudinal direction of the magnetic tape. As a method of control using a servo signal (servo control), timing-based servo (TBS), amplitude servo, or frequency servo is used.

As shown in European Computer Manufacturers Association (ECMA)-319, a timing-based servo system is used in a magnetic tape based on a linear-tape-open (LTO) standard (generally referred to as an "LTO tape"). In this timing-based servo system, the servo pattern is configured by continuously disposing a plurality of pairs of magnetic stripes (also referred to as "servo stripes") not parallel to each other in a longitudinal direction of the magnetic tape. As described above, a reason for that the servo pattern is configured with one pair of magnetic stripes not parallel to each other is because a servo signal reading element passing on the servo pattern recognizes a passage position thereof. Specifically, one pair of the magnetic stripes are formed so that a gap thereof is continuously changed along the width direction of the magnetic tape, and a relative position of the servo pattern and the servo signal reading element can be recognized, by the reading of the gap thereof by the servo signal reading element. The information of this relative position can realize the tracking of a data track. Accordingly, a plurality of servo tracks are generally set on the servo pattern along the width direction of the magnetic tape.

The servo band is configured of a servo signal continuous in the longitudinal direction of the magnetic tape. A plurality of servo bands are normally provided on the magnetic tape. For example, the number thereof is 5 in the LTO tape. A region interposed between two adjacent servo bands is called a data band. The data band is configured of a plurality of data tracks and each data track corresponds to each servo track.

In one embodiment, as shown in JP2004-318983A, information showing the number of servo band (also referred to as "servo band identification (ID)" or "Unique Data Band Identification Method (UDIM) information") is embedded in each servo band. This servo band ID is recorded by shifting a specific servo stripe among the plurality of pair of servo stripes in the servo band so that the position thereof is relatively deviated in the longitudinal direction of the magnetic tape. Specifically, the position of the shifted specific servo stripe among the plurality of pair of servo stripes is changed for each servo band. Accordingly, the recorded servo band ID becomes unique for each servo band, and therefore, the servo band can be uniquely specified by only reading one servo band by the servo signal reading element.

In a method of uniquely specifying the servo band, a staggered method as shown in ECMA-319 is used. In this staggered method, the group of one pair of magnetic stripes (servo stripe) not parallel to each other which are continuously disposed in the longitudinal direction of the magnetic tape is recorded so as to be shifted in the longitudinal direction of the magnetic tape for each servo band. A combination of this shifted servo band between the adjacent servo bands is set to be unique in the entire magnetic tape, and accordingly, the servo band can also be uniquely specified by reading of the servo pattern by two servo signal reading elements.

In addition, as shown in ECMA-319, information showing the position in the longitudinal direction of the magnetic tape (also referred to as "Longitudinal Position (LPOS) information") is normally embedded in each servo band. This LPOS information is recorded so that the position of one pair of servo stripes are shifted in the longitudinal direction of the magnetic tape, in the same manner as the UDIM information. However, unlike the UDIM information, the same signal is recorded on each servo band in this LPOS information.

Other information different from the UDIM information and the LPOS information can be embedded in the servo band. In this case, the embedded information may be different for each servo band as the UDIM information, or may be common in all of the servo bands, as the LPOS information.

In addition, as a method of embedding the information in the servo band, a method other than the method described above can be used. For example, a predetermined code may be recorded by thinning out a predetermined pair among the group of pairs of the servo stripes.

A servo pattern forming head is also referred to as a servo write head. The servo write head includes pairs of gaps corresponding to the pairs of magnetic stripes by the number of servo bands. In general, a core and a coil are respectively connected to each of the pairs of gaps, and a magnetic field generated in the core can generate leakage magnetic field in the pairs of gaps, by supplying a current pulse to the coil. In a case of forming the servo pattern, by inputting a current pulse while causing the magnetic tape to run on the servo write head, the magnetic pattern corresponding to the pair of gaps is transferred to the magnetic tape, and the servo pattern can be formed. A width of each gap can be suitably set in accordance with a density of the servo patterns to be formed. The width of each gap can be set as, for example, equal to or smaller than 1 μm, 1 to 10 μm, or equal to or greater than 10 μm.

Before forming the servo pattern on the magnetic tape, a demagnetization (erasing) process is generally performed on the magnetic tape. This erasing process can be performed by applying a uniform magnetic field to the magnetic tape by using a DC magnet and an AC magnet. The erasing process includes direct current (DC) erasing and alternating current (AC) erasing. The AC erasing is performed by slowing decreasing an intensity of the magnetic field, while reversing a direction of the magnetic field applied to the magnetic tape. Meanwhile, the DC erasing is performed by adding the magnetic field in one direction to the magnetic tape. The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. The erasing process may be performed with respect to all of the magnetic tape or may be performed for each servo band of the magnetic tape.

A direction of the magnetic field to the servo pattern to be formed is determined in accordance with the direction of erasing. For example, in a case where the horizontal DC erasing is performed to the magnetic tape, the formation of the servo pattern is performed so that the direction of the magnetic field and the direction of erasing becomes opposite to each other. Accordingly, the output of the servo signal obtained by the reading of the servo pattern can be increased. As disclosed in JP2012-053940A, in a case where the magnetic pattern is transferred to the magnetic tape subjected to the vertical DC erasing by using the gap, the servo signal obtained by the reading of the formed servo pattern has a unipolar pulse shape. Meanwhile, in a case where the magnetic pattern is transferred to the magnetic tape subjected to the horizontal DC erasing by using the gap, the servo signal obtained by the reading of the formed servo pattern has a bipolar pulse shape.

The magnetic tape is normally accommodated in a magnetic tape cartridge and the magnetic tape cartridge is mounted on a magnetic recording and reproducing device.

In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic recording and reproducing device in order to record and/or reproduce data on the magnetic tape, the magnetic tape is drawn from the magnetic tape cartridge and wound around the reel on the magnetic recording and reproducing device side. A magnetic head is disposed on a magnetic tape transportation path from the magnetic tape cartridge to a winding reel. Sending and winding of the magnetic tape are performed between a reel (supply reel) on the magnetic tape cartridge side and a reel (winding reel) on the magnetic recording and reproducing device side. In the meantime, the magnetic head comes into contact with and slides on the surface of the magnetic layer of the magnetic tape, and accordingly, the recording and/or reproduction of data is performed. With respect to this, in the twin reel type magnetic tape cartridge, both reels of the supply reel and the winding reel are provided in the magnetic tape cartridge. The magnetic tape cartridge may be any of single reel type magnetic tape cartridge and twin reel type magnetic tape cartridge. A well-known technology can be applied for other details of the magnetic tape cartridge.

Magnetic Recording and Reproducing Device

According to another aspect of the invention, there is provided a magnetic recording and reproducing device comprising the magnetic recording medium; and a magnetic head.

In the invention and the specification, the "magnetic recording and reproducing device" means a device capable of performing at least one of the recording of data on the magnetic recording medium or the reproducing of data recorded on the magnetic recording medium. Such a device is generally called a drive. The magnetic recording and reproducing device can be a sliding type magnetic recording and reproducing device. The sliding type magnetic recording and reproducing device is a device in which the surface of the magnetic layer and the magnetic head are in contact with each other and slide, in a case of performing recording of data on the magnetic recording medium and/or reproducing of the recorded data.

The magnetic head included in the magnetic recording and reproducing device can be a recording head capable of performing the recording of data on the magnetic recording medium, and can also be a reproducing head capable of performing the reproducing of data recorded on the magnetic recording medium. In addition, in the embodiment, the magnetic recording and reproducing device can include both of a recording head and a reproducing head as separate magnetic heads. In another embodiment, the magnetic head included in the magnetic recording and reproducing device can also have a configuration of comprising both of an element for recording data (recording element) and an element for reproducing data (reproducing element) in one magnetic head. Hereinafter, the element for recording data and the element for reproducing are collectively referred to as "elements for data". As the reproducing head, a magnetic head (MR head) including a magnetoresistive (MR) element capable of reading data recorded on the magnetic tape with excellent sensitivity as the reproducing element is preferable. As the MR head, various well-known MR heads such as an Anisotropic Magnetoresistive (AMR) head, a Giant Magnetoresistive (GMR) head, or a Tunnel Magnetoresistive (TMR) can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) including a servo signal reading element may be included in the magnetic recording and reproducing device. For example, the magnetic head which performs the recording of data and/or reproducing of the recorded data (hereinafter, also referred to as a "recording and reproducing head") can include two servo signal reading elements, and each of the two servo signal reading elements can read two adjacent servo bands at the same time. One or a plurality of elements for data can be disposed between the two servo signal reading elements.

In the magnetic recording and reproducing device, the recording of data on the magnetic recording medium and/or the reproducing of data recorded on the magnetic recording medium can be performed by bringing the surface of the magnetic layer of the magnetic recording medium into contact with the magnetic head and sliding. The magnetic recording and reproducing device may include the magnetic recording medium according to the embodiment of the invention, and well-known technologies can be applied for the other configurations.

For example, in a case of the recording and/or reproducing data with respect to the magnetic recording medium in which the servo pattern is formed, first, the tracking is performed by using the servo signal obtained by reading the servo pattern. That is, as the servo signal reading element follows a predetermined servo track, the element for data is controlled to pass on the target data track. The movement of the data track is performed by changing the servo track to be read by the servo signal reading element in the tape width direction.

In addition, the recording and reproducing head can also perform the recording and/or reproducing with respect to other data bands. In this case, the servo signal reading element is moved to a predetermined servo band by using the UDIM information described above, and the tracking with respect to the servo band may be started.

EXAMPLES

Hereinafter, the invention will be described with reference to examples. However, the invention is not limited to embodiments shown in the examples. "Parts" and "%" in the following description mean "parts by mass" and "% by mass", unless otherwise noted. In addition, steps and evaluations described below are performed in an environment of an atmosphere temperature of 23° C. 1° C., unless otherwise noted.

Example 1

(1) Preparation of Alumina Dispersion 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a $SO_3Na$ group-containing polyester polyurethane resin (UR-4800 ($SO_3Na$ group: 0.08 meq/g) manufactured by Toyobo Co., Ltd.), and 570.0 parts of a mixed solvent of methyl ethyl ketone and cyclohexanone (mass ratio of 1:1) as a solvent were mixed with 100.0 parts of alumina powder (HIT-80 manufactured by Sumitomo Chemical Co., Ltd.) having a gelatinization ratio of approximately 65% and a Brunauer-Emmett-Teller (BET) specific surface area of 20 $m^2/g$, and dispersed in the presence of zirconia beads by a paint shaker for 5 hours. After the dispersion, the dispersion liquid and the beads were separated by a mesh and an alumina dispersion was obtained.

(2) List of Magnetic Layer Forming Composition

Magnetic Liquid

Ferromagnetic powder (Type: See Table 1) 100.0 parts
Binding agent (Type: See Table 1) See Table 1
Cyclohexanone: 150.0 parts
Methyl ethyl ketone: 150.0 parts
Abrasive Solution
Alumina dispersion prepared in the section (1): 6.0 parts
Projection formation agent liquid
Projection formation agent (type: see Table 1): 1.3 parts
Methyl ethyl ketone: 9.0 parts
Cyclohexanone: 6.0 parts
Other Components
Stearic acid: 2.0 parts
Stearic acid amide: 0.2 part
Butyl stearate: 2.0 parts
Polyisocyanate (CORONATE (registered trademark) manufactured by Tosoh Corporation): 2.5 parts
Finishing Additive Solvent
Cyclohexanone: 200.0 parts
Methyl ethyl ketone: 200.0 parts (3) List of Magnetic Layer Forming Composition Non-magnetic inorganic powder: α-iron oxide: 100.0 parts
Average particle size (average long axis length): 0.15 μm
Average acicular ratio: 7
BET specific surface area: 52 $m^2/g$
Carbon black: 20.0 parts
Average particle size: 20 nm
Binding agent A: 18.0 parts
Stearic acid: 2.0 parts
Stearic acid amide: 0.2 parts
Butyl stearate: 2.0 parts
Cyclohexanone: 300.0 parts
Methyl ethyl ketone: 300.0 parts (4) List of Back Coating Layer Forming Composition
Non-magnetic inorganic powder: α-iron oxide: 80.0 parts
Average particle size (average long axis length): 0.15 μm
Average acicular ratio: 7
BET specific surface area: 52 m$^2$/g
Carbon black: 20.0 parts
Average particle size: 20 nm
Vinyl chloride copolymer: 13.0 parts
Sulfonate group-containing polyurethane resin: 6.0 parts
Phenylphosphonic acid: 3.0 parts
Methyl ethyl ketone: 155.0 parts
Polyisocyanate: 5.0 parts
Cyclohexanone: 355.0 parts (5) Preparation of Each Layer Forming Composition The magnetic layer forming composition was prepared by the following method.

A magnetic liquid was prepared by dispersing (beads-dispersing) various components with a batch type vertical sand mill for 24 hours. As dispersion beads, zirconia beads having a bead diameter of 0.5 mm were used.

The projection formation agent liquid was prepared by filtering a dispersion liquid obtained by mixing the components of the above-mentioned projection formation agent liquid and then ultrasonically treating (dispersing) for 60 minutes with an ultrasonic output of 500 watts per 200 cc by a horn-type ultrasonic dispersing device with a filter having a hole size of 0.5 μm.

Using the sand mill, the magnetic liquid, the abrasive solution, the projection formation agent liquid, the binding agent A additionally added (0.1 parts to 100.0 parts of the ferromagnetic powder in the magnetic liquid) and other components (other components and the finishing additive solvent) were mixed and bead-dispersed for 5 minutes, and a treatment (ultrasonic dispersion) was performed for 0.5 minutes using a batch type ultrasonic device (20 kHz, 300 W). Thereafter, the mixture was filtered using a filter having a hole size of 0.5 μm to prepare a magnetic layer forming composition.

The non-magnetic layer forming composition was prepared by the following method.

Each component excluding the lubricant (stearic acid, stearic acid amide, and butyl stearate), cyclohexanone, and methyl ethyl ketone was dispersed by using batch type vertical sand mill for 24 hours to obtain a dispersion liquid. As dispersion beads, zirconia beads having a bead diameter of 0.5 mm were used. After that, the remaining components were added into the obtained dispersion liquid and stirred with a dissolver. The dispersion liquid obtained as described above was filtered with a filter having a hole diameter of 0.5 μm and a non-magnetic layer forming composition was prepared.

The back coating layer forming composition was prepared by the following method.

Each component excluding polyisocyanate and cyclohexanone was kneaded by an open kneader and diluted, and was subjected to a dispersion process of 12 passes, with a transverse beads mill disperser and zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. The dispersion liquid obtained as described above was filtered with a filter having a hole diameter of 1 μm and a back coating layer forming composition was prepared.

(6) Manufacturing Method of Magnetic Tape

The non-magnetic layer forming composition prepared in the section (5) was applied to a surface of a biaxial stretching support made of polyethylene naphthalate having a thickness of 5.00 μm so that the thickness after the drying becomes 1.00 μm and was dried to form a non-magnetic layer.

Then, in a coating device disposed with a magnet for applying an alternating magnetic field, the magnetic layer forming composition prepared in the section (5) was applied onto the surface of the non-magnetic layer so that the thickness after the drying becomes 0.10 μm, while applying an alternating magnetic field (magnetic field strength: 0.15 T), to form a coating layer. The applying of the alternating magnetic field was performed so that the alternating magnetic field was applied vertically to the surface of the coating layer. After that, a homeotropic alignment process was performed by applying a direct current magnetic field having a magnetic field strength of 0.30 T in a vertical direction with respect to a surface of a coating layer, while the coating layer of the magnetic layer forming composition is wet (not dried). After that, the coating layer was dried to form a magnetic layer.

After that, the back coating layer forming composition prepared in the section (5) was applied to the surface of the support made of polyethylene naphthalate on a side opposite to the surface where the non-magnetic layer and the magnetic layer were formed, so that the thickness after the drying becomes 0.50 μm, and was dried to form a back coating layer.

Then, a calender process (surface smoothing treatment) was performed by using a calender roll configured of only a metal roll, at a speed of 100 m/min, linear pressure of 294 kN/m (300 kg/cm), and a calender temperature (surface temperature of a calender roll) of 100° C.

Then, the heat treatment was performed in the environment of the atmosphere temperature of 70° C. for 36 hours. After the heat treatment, the slitting was performed to have a width of ½ inches (0.0127 meters) to manufacture a magnetic tape.

In a state where the magnetic layer of the manufactured magnetic tape was demagnetized, servo patterns having disposition and shapes according to the LTO Ultrium format were formed on the magnetic layer by using a servo write head mounted on a servo writer. Accordingly, a magnetic tape including data bands, servo bands, and guide bands in the disposition according to the LTO Ultrium format in the magnetic layer, and including servo patterns having the disposition and the shape according to the LTO Ultrium format on the servo band was obtained.

Examples 2 to 21 and Comparative Examples 1 to 13

A magnetic tape was manufactured by the same method as in the Example 1, except that various conditions shown in Table 1 were changed as shown in Table 1.

In Table 1, in the examples and the comparative examples in which "performed" is shown in the column of the additional addition of the binding agent, the additional addition of the binding agent A (0.1 part with respect to 100.0 parts of the ferromagnetic powder in the magnetic liquid) was performed during the preparation of the magnetic layer forming composition, in the same manner as in Example 1. On the other hand, in the comparative examples in which "not performed" is shown in this column, the additional addition of the binding agent A was not performed.

In Table 1, in the examples and the comparative examples in which "performed" is shown in the column of the alternating magnetic field application during coating, the step subsequent to the coating step of the magnetic layer forming composition was performed by the same method as in Example 1. That is, the application of the alternating magnetic field was performed during coating of the magnetic layer forming composition in the same manner as in Example 1. On the other hand, in the comparative examples in which "not performed" is shown in this column, the step subsequent to the coating step of the magnetic layer forming composition was performed by the same method as in Example 1, except that the application of the alternating magnetic field was not performed.

Projection Formation Agent

A projection formation agent used for manufacturing magnetic tape of examples or comparative examples is as follows. A projection formation agent 1 and a projection formation agent 3 are particles having a low surface smoothness of a surface of particles. A particle shape of a projection formation agent 2 is a shape of a cocoon. A particle shape of a projection formation agent 4 is a so-called indeterminate shape. A particle shape of a projection formation agent 5 is a shape closer to a sphere.

Projection formation agent 1: ATLAS (composite particles of silica and polymer) manufactured by Cabot Corporation, average particle size: 100 nm Projection formation agent 2: TGC6020N (silica particles) manufactured by Cabot Corporation, average particle size: 140 nm Projection formation agent 3: Cataloid (water dispersed sol of silica particles; as a projection formation agent for preparing a projection formation agent liquid, a dried solid material obtained by removing the solvent by heating the water dispersed sol described above is used) manufactured by JGC c&c, average particle size: 120 nm Projection formation agent 4: ASAHI #50 (carbon black) manufactured by Asahi Carbon Co., Ltd., average particle size: 300 nm Projection formation agent 5: PL-10L (water dispersed sol of silica particles; as a projection formation agent for preparing a projection formation agent liquid, a dried solid material obtained by removing the solvent by heating the water dispersed sol described above is used) manufactured by FUSO CHEMICAL CO., LTD., average particle size: 130 nm Binding Agent In Table 1, the "binding agent A" is a $SO_3Na$ group-containing polyurethane resin (weight-average molecular weight: 70,000, $SO_3Na$ group: 0.20 meq/g).

In Table 1, the "binding agent B" is a vinyl chloride copolymer (product name: MR110, $SO_3K$ group-containing vinyl chloride copolymer, $SO_3K$ group: 0.07 meq/g) manufactured by Kaneka Corporation.

Ferromagnetic Powder

In Table 1, "BaFe" is a hexagonal barium ferrite powder having an average particle size (average plate diameter) of 21 nm. "SrFe1" and "SrFe2" respectively indicate hexagonal strontium ferrite powder, and "ε-iron oxide" indicates ε-iron oxide powder.

The activation volume and the anisotropy constant Ku of the various ferromagnetic powders are values obtained by the method described above regarding each ferromagnetic powder by using an oscillation sample type magnetic-flux meter (manufactured by Toei Industry Co., Ltd.).

The mass magnetization σs is a value measured using a oscillation sample type magnetic-flux meter (manufactured by Toei Industry Co., Ltd.) at a magnetic field strength of 15 kOe.

Method 1 for producing hexagonal strontium ferrite powder

In Table 1, "SrFe1" is a hexagonal strontium ferrite powder produced by the following method.

1707 g of $SrCO_3$, 687 g of $H3BO3$, 1120 g of $Fe2O3$, 45 g of $Al(OH)3$, 24 g of $BaCO3$, 13 g of $CaCO3$, and 235 g of $Nd2O3$ were weighed and mixed in a mixer to obtain a raw material mixture.

The obtained raw material mixture was dissolved in a platinum crucible at a dissolving temperature of 1390° C., and a tap hole provided on the bottom of the platinum crucible was heated while stirring the dissolved liquid, and the dissolved liquid was tapped in a rod shape at approximately 6 g/sec. The tap liquid was rolled and cooled with a water cooling twin roller to prepare an amorphous body.

280 g of the prepared amorphous body was put into an electronic furnace, heated to 635° C. (crystallization temperature) at a rate of temperature rise of 3.5° C./min, and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 ml of an acetic acid aqueous solution having a concentration of 1% were added to a glass bottle, and a dispersion process was performed in a paint shaker for 3 hours. After that, the obtained dispersion liquid and the beads were dispersed and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder (in Table 1, "SrFe1") obtained as described above, an average particle size was 18 nm, an activation volume was 902 $nm^3$, an anisotropy constant Ku was $2.2 \times 10^5$ $J/m^3$, and a mass magnetization σs was 49 $A \cdot m^2/kg$.

12 mg of a sample powder was collected from the hexagonal strontium ferrite powder obtained as described above, the element analysis of a filtrate obtained by the partial dissolving of this sample powder under the dissolving conditions described above was performed by the ICP analysis device, and a surface layer portion content of a neodymium atom was obtained.

Separately, 12 mg of a sample powder was collected from the hexagonal strontium ferrite powder obtained as described above, the element analysis of a filtrate obtained by the total dissolving of this sample powder under the dissolving conditions described above was performed by the ICP analysis device, and a bulk content of a neodymium atom was obtained.

The content (bulk content) of the neodymium atom in the hexagonal strontium ferrite powder obtained as described above with respect to 100 atom % of iron atom was 2.9 atom %. In addition, the surface layer portion content of the neodymium atom was 8.0 atom %. A ratio of the surface layer portion content and the bulk content, "surface layer portion content/bulk content" was 2.8 and it was confirmed that the neodymium atom is unevenly distributed on the surface layer of the particles.

A crystal structure of the hexagonal ferrite shown by the powder obtained as described above was confirmed by scanning CuKα ray under the condition of a voltage of 45 kV and intensity of 40 mA and measuring an X-ray diffraction pattern under the following conditions (X-ray diffraction analysis). The powder obtained as described above showed a crystal structure of magnetoplumbite type (M type) hexagonal ferrite. In addition, a crystal phase detected by the X-ray diffraction analysis was a magnetoplumbite type single phase.

PANalytical X'Pert Pro diffractometer, PIXcel detector
Soller slit of incident beam and diffraction beam: 0.017 radians
　Fixed angle of dispersion slit: ¼ degrees
　Mask: 10 mm
　Scattering prevention slit: ¼ degrees
　Measurement mode: continuous
　Measurement time per 1 stage: 3 seconds
　Measurement speed: 0.017 degrees per second
　Measurement step: 0.05 degree
　Method 2 for producing hexagonal strontium ferrite powder In Table 1, "SrFe2" is a hexagonal strontium ferrite powder produced by the following method.

1725 g of SrCO3, 666 g of H3BO3, 1332 g of Fe2O3, 52 g of Al(OH)3, 34 g of CaCO3, and 141 g of BaCO3 were weighed and mixed in a mixer to obtain a raw material mixture.

The obtained raw material mixture was dissolved in a platinum crucible at a dissolving temperature of 1380° C., and a tap hole provided on the bottom of the platinum crucible was heated while stirring the dissolved liquid, and the dissolved liquid was tapped in a rod shape at approximately 6 g/sec. The tap liquid was rolled and cooled with a water cooling twin roll to prepare an amorphous body.

280 g of the obtained amorphous body was put into an electronic furnace, heated to 645° C. (crystallization temperature) and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 ml of an acetic acid aqueous solution having a concentration of 1% were added to a glass bottle, and a dispersion process was performed in a paint shaker for 3 hours. After that, the obtained dispersion liquid and the beads were dispersed and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder (in Table 1, "SrFe2") obtained as described above, an average particle size was 19 nm, an activation volume was 1102 nm3, an anisotropy constant Ku was $2.0 \times 10^5$ J/m3, and a mass magnetization σs was 50 A·m2/kg.

Method for Producing ε-Iron Oxide Powder
In Table 1, "ε-iron oxide" is an ε-iron oxide powder produced by the following method.

4.0 g of ammonia aqueous solution having a concentration of 25% was added to a material obtained by dissolving 8.3 g of iron (III) nitrate nonahydrate, 1.3 g of gallium (III) nitrate octahydrate, 190 mg of cobalt (II) nitrate hexahydrate, 150 mg of titanium (IV) sulfate, and 1.5 g of polyvinyl pyrrolidone (PVP) in 90 g of pure water, while stirring by using a magnetic stirrer, in an atmosphere under the conditions of an atmosphere temperature of 25° C., and the mixture was stirred for 2 hours still under the temperature condition of the atmosphere temperature of 25° C. A citric acid aqueous solution obtained by dissolving 1 g of citric acid in 9 g of pure water was added to the obtained solution and stirred for 1 hour. The powder precipitated after the stirring was collected by centrifugal separation, washed with pure water, and dried in a heating furnace at a furnace inner temperature of 80° C.

800 g of pure water was added to the dried powder and the powder was dispersed in water again, to obtain a dispersion liquid. The obtained dispersion liquid was heated to a liquid temperature of 50° C., and 40 g of ammonia aqueous solution having a concentration of 25% was added dropwise while stirring. The stirring was performed for 1 hour while holding the temperature of 50° C., and 14 mL of tetraethoxysilane (TEOS) was added dropwise and stirred for 24 hours. 50 g of ammonium sulfate was added to the obtained reaction solution, the precipitated powder was collected by centrifugal separation, washed with pure water, and dried in a heating furnace at a furnace inner temperature of 80° C. for 24 hours, and a precursor of ferromagnetic powder was obtained.

The heating furnace at a furnace inner temperature of 1000° C. was filled with the obtained precursor of ferromagnetic powder in the atmosphere and subjected to heat treatment for 4 hours.

The thermal-treated precursor of ferromagnetic powder was put into sodium hydroxide (NaOH) aqueous solution having a concentration of 4 mol/L, the liquid temperature was held at 70° C., stirring was performed for 24 hours, and accordingly, a silicon acid compound which was an impurity was removed from the thermal-treated precursor of ferromagnetic powder.

After that, by the centrifugal separation process, ferromagnetic powder obtained by removing the silicon acid compound was collected and washed with pure water, and ferromagnetic powder was obtained.

The composition of the obtained ferromagnetic powder was confirmed by Inductively Coupled Plasma-Optical Emission Spectrometry (ICP-OES), and Ga, Co, and Ti substitution type ε-iron oxide ($\varepsilon$-$Ga_{0.28}Co_{0.05}Ti_{0.05}Fe_{1.62}O_3$) was obtained. In addition, the X-ray diffraction analysis was performed under the same conditions as disclosed regarding the method 1 for producing the hexagonal strontium ferrite powder described above, and it was confirmed that the obtained ferromagnetic powder has a crystal structure of a single phase which is an ε phase not including a crystal structure of an α phase and a γ phase (ε-iron oxide type crystal structure) from the peak of the X-ray diffraction pattern.

Regarding the obtained (ε-iron oxide powder (in Table 1, "ε-iron oxide"), an average particle size was 12 nm, an activation volume was 746 nm3, an anisotropy constant Ku was $1.2 \times 10^5$ J/m3, and a mass magnetization σs was 16 A·m2/kg.

Evaluation Method
(1) Isoelectric Point of Surface Zeta Potential of Magnetic Layer after Pressing Each magnetic tape of the examples and the comparative examples was passed between two rolls (without heating the rolls) six times in total while running the magnetic tape in a longitudinal direction at a speed of 20 m/min in a state where a tension of 0.5 N/m was applied, by using a calender treatment device including a 7-step calender roll configured of only a metal roll in an environment of an atmosphere temperature of 20° C. to 25° C. and relative humidity of 40% to 60%, and accordingly, the pressing was performed by applying a surface pressure of 70 atm to the surface of each magnetic layer, during the passing between each roll.

Six samples for isoelectric point measurement were cut out from each magnetic tape of the examples and the comparative examples after the pressing and the two samples were disposed in the measurement cell in one measurement. In the measurement cell, a sample installing surface and a surface of the back coating layer of the sample were bonded to each other by using a double-sided tape in upper and lower sample table (size of each sample installing surface is 1 cm×2 cm) of the measurement cell. By doing so, after disposing the two samples, in a case where an electrolyte flows in the measurement cell, the surface of the magnetic layer of the two samples comes into contact with the electrolyte on the upper and lower sample table of the measurement cell, and thus, the surface zeta potential of the surface of the magnetic layer can be measured. The measurement was performed three times in total by using two samples in each measurement, and the isoelectric points of the surface zeta potential of the magnetic layer were obtained. An arithmetical mean of the obtained three values by the three times of the measurements is shown in Table 1, as the isoelectric point of the surface zeta potential of the magnetic layer of each magnetic tape after pressing. As a surface zeta potential measurement device, SurPASS manufactured by Anton Paar was used. The measurement conditions were set as follows. Other details of the method of obtaining the isoelectric point are as described above.

Measurement cell: variable gap cell (20 mm×10 mm)
Measurement mode: Streaming Current
Gap: approximately 200 μm
Measurement temperature: room temperature
Ramp Target Pressure/Time: 400,000 Pa (400 mbar)/60 seconds Electrolyte: KCl aqueous solution having concentration of 1 mmol/L (adjusted pH to 9)
pH adjusting solution: HCl aqueous solution having concentration of 0.1 mol/L or KOH aqueous solution having concentration of 0.1 mol/L
Measurement pH: pH 9→pH 3 (measured at 13 measurement points in total at interval of approximately 0.5)

(2) Evaluation of Running Stability after Pressing at Pressure of 70 atm

Regarding each magnetic tape of the examples and the comparative examples, a position error signal (PES) was obtained by the following method after the pressing in the section (1).

A servo pattern was read with a verifying head on a servo writer used in the formation of the servo pattern. The verifying head is a magnetic head for reading for confirming quality of the servo pattern formed in the magnetic tape, and an element for reading is disposed on a position corresponding to the position (position of the magnetic tape in a width direction) of the servo pattern, in the same manner as the magnetic head of the well-known magnetic tape device (drive).

In the verifying head, a well-known PES arithmetic circuit which calculates head positioning accuracy of the servo system as the PES is connected from an electrical signal obtained by reading the servo pattern in the verifying head. The PES arithmetic circuit calculates, as necessary, displacement of the magnetic tape in a width direction from the input electrical signal (pulse signal), and a value obtained by applying a high pass filter (cut-off. 500 cycles/m) with respect to a temporal change information (signal) of this displacement was calculated as the PES. The PES can be an index of running stability and it is possible to evaluate that the running stability is excellent, in a case where the PES calculated described above is equal to or smaller than 18 nm.

The result described above is shown in Table 1 (Tables 1-1 to 1-5).

TABLE 1

| | | | Unit | Example 1 | Example 2 | Example 3 | Example 4 | Example 5 | Example 6 | Example 7 |
|---|---|---|---|---|---|---|---|---|---|---|
| Formation of magnetic layer | Ferromagnetic powder | Type | — | BaFe | BaFe | BaFe | BaFe | BaFe | BaFe | BaFe |
| | Projection formation agent | Type | | Projection formation agent 1 | Projection formation agent 2 | Projection formation agent 3 | Projection formation agent 1 | Projection formation agent 2 | Projection formation agent 3 | Projection formation agent 1 |
| | Content of binding agent in magnetic liquid | Binding agent A | Parts | 5.0 | 5.0 | 5.0 | 20.0 | 20.0 | 20.0 | 0 |
| | | Binding agent B | Parts | 0 | 0 | 0 | 0 | 0 | 0 | 10.0 |
| | Alternating magnetic field application during coating | | — | Performed | Performed | Performed | Performed | Performed | Performed | Performed |
| | Additional addition of binding agent | | — | Performed | Performed | Performed | Performed | Performed | Performed | Performed |
| Isoelectric point of surface zeta potential of magnetic layer after pressing | | | — | 3.8 | 3.8 | 3.8 | 2.7 | 2.7 | 2.7 | 3.5 |
| PES | | | nm | 17 | 17 | 17 | 12 | 12 | 12 | 15 |

| | | | Unit | Example 8 | Example 9 | Example 10 | Example 11 | Example 12 | Example 13 | Example 14 |
|---|---|---|---|---|---|---|---|---|---|---|
| Formation of magnetic layer | Ferromagnetic powder | Type | — | BaFe | BaFe | BaFe | BaFe | BaFe | SrFe1 | SrFe1 |
| | Projection formation agent | Type | | Projection formation agent 2 | Projection formation agent 3 | Projection formation agent 1 | Projection formation agent 2 | Projection formation agent 3 | Projection formation agent 1 | Projection formation agent 2 |
| | Content of binding agent in magnetic liquid | Binding agent A | Parts | 0 | 0 | 10.0 | 10.0 | 10.0 | 5.0 | 5.0 |
| | | Binding agent B | Parts | 10.0 | 10.0 | 10.0 | 10.0 | 10.0 | 0 | 0 |

TABLE 1-continued

| | | | | | | | | | | |
|---|---|---|---|---|---|---|---|---|---|---|
| | Alternating magnetic field—application during coating | | — | Performed | Performed | Performed | Performed | Performed | Performed | Performed |
| | Additional addition of binding agent | | — | Performed | Performed | Performed | Performed | Performed | Performed | Performed |
| | Isoelectric point of surface zeta potential of magnetic layer after pressing | | — | 3.5 | 3.5 | 3.0 | 3.0 | 3.0 | 3.8 | 3.8 |
| | PES | | nm | 15 | 15 | 17 | 17 | 17 | 17 | 17 |

| | | | Unit | Example 15 | Example 16 | Example 17 | Example 18 | Example 19 | Example 20 | Example 21 |
|---|---|---|---|---|---|---|---|---|---|---|
| Formation of magnetic layer | Ferromagnetic powder | Type | — | SrFe1 | SrFe2 | SrFe2 | SrFe2 | c-iron oxide | c-iron oxide | c-iron oxide |
| | Projection formation agent | Type | — | Projection formation agent 3 | Projection formation agent 1 | Projection formation agent 2 | Projection formation agent 3 | Projection formation agent 1 | Projection formation agent 2 | Projection formation agent 3 |
| | Content of binding agent in magnetic liquid | Binding agent A | Parts | 5.0 | 5.0 | 5.0 | 5.0 | 5.0 | 5.0 | 5.0 |
| | | Binding agent B | Parts | 0 | 0 | 0 | 0 | 0 | 0 | 0 |
| | Alternating magnetic field—application during coating | | — | Performed | Performed | Performed | Performed | Performed | Performed | Performed |
| | Additional addition of binding agent | | — | Performed | Performed | Performed | Performed | Performed | Performed | Performed |
| | Isoelectric point of surface zeta potential of magnetic layer after pressing | | — | 3.8 | 3.8 | 3.8 | 3.8 | 3.8 | 3.8 | 3.8 |
| | PES | | nm | 17 | 17 | 17 | 17 | 17 | 17 | 17 |

| | | | Unit | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Formation of magnetic layer | Ferromagnetic powder | Type | — | BaFe | BaFe | BaFe | BaFe | BaFe | BaFe | BaFe |
| | Projection formation agent | Type | — | Projection formation agent 4 | Projection formation agent 5 | Projection formation agent 4 | Projection formation agent 5 | Projection formation agent 4 | Projection formation agent 5 | Projection formation agent 4 |
| | Content of binding agent in magnetic liquid | Binding agent A | Parts | 5.0 | 5.0 | 5.0 | 5.0 | 20.0 | 20.0 | 0 |
| | | Binding agent B | Parts | 0 | 0 | 0 | 0 | 0 | 0 | 10.0 |
| | Alternating magnetic field—application during coating | | — | Not performed | Not performed | Performed | Performed | Performed | Performed | Performed |
| | Additional addition of binding agent | | — | Not performed | Not performed | Performed | Performed | Performed | Performed | Performed |
| | Isoelectric point of surface zeta potential of magnetic layer after pressing | | — | 5.0 | 5.0 | 4.4 | 4.4 | 4.4 | 4.4 | 4.5 |
| | PES | | nm | 30 | 30 | 26 | 26 | 26 | 26 | 27 |

| | | | Unit | Comparative Example 8 | Comparative Example 9 | Comparative Example 10 | Comparative Example 11 | Comparative Example 12 | Comparative Example 13 |
|---|---|---|---|---|---|---|---|---|---|
| Formation of magnetic layer | Ferromagnetic powder | Type | — | BaFe | BaFe | BaFe | BaFe | BaFe | BaFe |
| | Projection formation agent | Type | — | Projection formation agent 5 | Projection formation agent 4 | Projection formation agent 5 | Projection formation agent 1 | Projection formation agent 2 | Projection formation agent 3 |
| | Content of binding agent in magnetic liquid | Binding agent A | Parts | 0 | 10.0 | 10.0 | 5.0 | 5.0 | 5.0 |
| | | Binding agent B | Parts | 10.0 | 10.0 | 10.0 | 0 | 0 | 0 |
| | Alternating magnetic field—application during coating | | — | Performed | Performed | Performed | Not performed | Not performed | Not performed |
| | Additional addition of binding agent | | — | Performed | Performed | Performed | Not performed | Not performed | Not performed |
| | Isoelectric point of surface zeta potential of magnetic layer after pressing | | — | 4.5 | 4.6 | 4.6 | 4.8 | 4.8 | 4.8 |
| | PES | | nm | 27 | 28 | 28 | 29 | 29 | 29 |

From the result shown in Table 1, it can be confirmed that, in all of the magnetic tapes of the examples, excellent running stability is exhibited after the pressing at a pressure of 70 atm, that is, in a state corresponding to the state after the long-term storage. According to this magnetic tape, even after the magnetic tape is accommodated in a state of being wound around a reel for a long period of time in the magnetic tape cartridge, after information with a low access frequency is recorded, the stable running can be performed in the magnetic recording and reproducing device, and the magnetic tape is suitable as a recording medium for archive.

One aspect of the invention is effective for data storage.

What is claimed is:

1. A magnetic recording medium comprising:
a non-magnetic support; and
a magnetic layer including a ferromagnetic powder,
wherein an isoelectric point of a surface zeta potential of the magnetic layer after pressing the magnetic layer at a pressure of 70 atm is equal to or less than 3.8.

2. The magnetic recording medium according to claim 1, wherein the isoelectric point is 2.5 to 3.8.

3. The magnetic recording medium according to claim 1, wherein the magnetic layer includes inorganic oxide-based particles.

4. The magnetic recording medium according to claim 3, wherein the inorganic oxide-based particles are composite particles of an inorganic oxide and a polymer.

5. The magnetic recording medium according to claim 1, wherein the magnetic layer includes a binding agent having an acidic group.

6. The magnetic recording medium according to claim 5, wherein the acidic group is at least one kind of acidic group selected from the group consisting of sulfonic acid groups and salts thereof.

7. The magnetic recording medium according to claim 1, further comprising:
a non-magnetic layer including a non-magnetic powder between the non-magnetic support and the magnetic layer.

8. The magnetic recording medium according to claim 1, further comprising:
a back coating layer including a non-magnetic powder on a surface of the non-magnetic support opposite to a surface provided with the magnetic layer.

9. The magnetic recording medium according to claim 1, wherein the magnetic recording medium is a magnetic tape.

10. A magnetic recording and reproducing device comprising:
a magnetic recording medium; and
a magnetic head,
wherein
the magnetic recording medium is a magnetic recording medium comprising:
a non-magnetic support; and
a magnetic layer including a ferromagnetic powder,
wherein an isoelectric point of a surface zeta potential of the magnetic layer after pressing the magnetic layer at a pressure of 70 atm is equal to or less than 3.8.

11. The magnetic recording medium according to claim 10, wherein the isoelectric point is 2.5 to 3.8.

12. The magnetic recording and reproducing device according to claim 10, wherein the magnetic layer includes inorganic oxide-based particles.

13. The magnetic recording and reproducing device according to claim 12, wherein the inorganic oxide-based particles are composite particles of an inorganic oxide and a polymer.

14. The magnetic recording and reproducing device according to claim 1, wherein the magnetic layer includes a binding agent having an acidic group.

15. The magnetic recording and reproducing device according to claim 14, wherein the acidic group is at least one kind of acidic group selected from the group consisting of sulfonic acid groups and salts thereof.

16. The magnetic recording and reproducing device according to claim 10, wherein the magnetic recording medium further comprises a non-magnetic layer including a non-magnetic powder between the non-magnetic support and the magnetic layer.

17. The magnetic recording and reproducing device according to claim 10, wherein the magnetic recording medium further comprises a back coating layer including a non-magnetic powder on a surface of the non-magnetic support opposite to a surface provided with the magnetic layer.

18. The magnetic recording and reproducing device according to claim 10, wherein the magnetic recording medium is a magnetic tape.

* * * * *